United States Patent
Hazeyama et al.

(10) Patent No.: US 9,595,851 B2
(45) Date of Patent: Mar. 14, 2017

(54) ROTARY ELECTRIC MACHINE

(71) Applicant: MITSUBISHI ELECTRIC CORPORATION, Chiyoda-ku (JP)

(72) Inventors: Moriyuki Hazeyama, Chiyoda-ku (JP); Takuma Sasai, Chiyoda-ku (JP); Shinsuke Kayano, Chiyoda-ku (JP); Masaya Inoue, Chiyoda-ku (JP); Shinji Nishimura, Chiyoda-ku (JP); Akihiro Daikoku, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 56 days.

(21) Appl. No.: 14/758,883

(22) PCT Filed: Jan. 17, 2014

(86) PCT No.: PCT/JP2014/050816
§ 371 (c)(1),
(2) Date: Jul. 1, 2015

(87) PCT Pub. No.: WO2014/115655
PCT Pub. Date: Jul. 31, 2014

(65) Prior Publication Data
US 2015/0357870 A1    Dec. 10, 2015

(30) Foreign Application Priority Data

Jan. 23, 2013    (JP) ................ 2013-010152

(51) Int. Cl.
*H02K 1/27*    (2006.01)
(52) U.S. Cl.
CPC ................ *H02K 1/2766* (2013.01)

(58) Field of Classification Search
CPC .......................... H02K 1/27–1/2793
(Continued)

(56) References Cited

U.S. PATENT DOCUMENTS 5,300,910 A * 4/1994 Unkelbach ............ H01F 7/0284
335/302
2002/0180294 A1    12/2002 Kaneda et al.
(Continued)

FOREIGN PATENT DOCUMENTS

JP    H10-191585    7/1998
JP    H11-113199    4/1999
(Continued)

OTHER PUBLICATIONS

International Search Report Issued Apr. 8, 2014 in PCT/JP2014/050816 Filed Jan. 17, 2014.
(Continued)

*Primary Examiner* — Thomas Truong
(74) *Attorney, Agent, or Firm* — Oblon, McClelland, Maier & Neustadt, L.L.P.

(57) ABSTRACT

Permanent magnets that form individual magnetic poles are configured by arranging three magnet blocks to be spaced apart from each other circumferentially, the three magnet blocks are each formed such that cross-sectional shapes that are perpendicular to a central axis of a rotor core are radially outwardly convex, and circumferential widths are narrower in magnet blocks that are further away from a magnetic pole center, and the three magnet blocks that are arranged circumferentially are formed to have mirror symmetry relative to a plane that passes through the magnetic pole center and the central axis of the rotor core.

18 Claims, 11 Drawing Sheets

(58) Field of Classification Search
USPC .......................................... 310/156.01–156.84
See application file for complete search history.

(56) References Cited

U.S. PATENT DOCUMENTS

2002/0180295 A1    12/2002  Kaneda et al.
2009/0015090 A1     1/2009  Kimura et al.
2012/0262019 A1*   10/2012  Smith ................. H02K 1/2766
                                                       310/156.07

FOREIGN PATENT DOCUMENTS

| JP | 2002 027690 | 1/2002 |
| JP | 2002 272030 | 9/2002 |
| JP | 2002 354721 | 12/2002 |
| JP | 2008 283806 | 11/2008 |
| JP | 2009 022089 | 1/2009 |
| JP | 2010 207067 | 9/2010 |
| JP | 2010 246185 | 10/2010 |

OTHER PUBLICATIONS

Japanese Office Action issued Dec. 2, 2014 in Application No. JP 2014-541474 Filed Jan. 17, 2014 (with English translation).

* cited by examiner

ROTARY ELECTRIC MACHINE

TECHNICAL FIELD

The present invention relates to a rotary electric machine such as an electric motor or a generator that is used in an electric vehicle or a hybrid vehicle, for example, and to a rotor that is mounted therein, and particularly relates to an embedded permanent magnet rotor in which permanent magnets are embedded in an outer circumferential side of a rotor core.

BACKGROUND ART

In conventional embedded permanent magnet rotary electric machines, torque reduction has been prevented by forming respective magnetic poles by a plurality of permanent magnets that are divided by segments of a rotor core, to ensure strength against centrifugal forces, and enable high-speed rotation, and also by forming each of the permanent magnets such that a distance between an outer circumferential side of the permanent magnets and an outer circumference of the rotor core increases gradually toward the segment from a circumferentially central portion, to reduce the amount of magnetic flux of the permanent magnets that leak through the segment (see Patent Literature 1, for example).

In other conventional permanent magnet rotary electric machines, togging torque has been reduced by making a circumferential arrangement of a plurality of permanent magnets that form respective magnetic poles into a Halbach array in which directions of magnetization are directions that converge on pole centers, or are directions which are spread out in a radial pattern (see Patent Literature 2, for example).

CITATION LIST

Patent Literature

[Patent Literature 1] Japanese Patent Laid-Open No. 2002-272030 (Gazette)

[Patent Literature 2]: Japanese Patent Laid-Open No. 2002-354721 (Gazette)

SUMMARY OF THE INVENTION

Problem to be Solved by the Invention

In Patent Literature 1, cogging torque has not been taken into consideration at all, but based on the description in Patent Literature 2, it is possible to reduce cogging torque by making the circumferential arrangement of the plurality of permanent magnets that form the respective magnetic poles into a Halbach array. However, in Patent Literature 1 and 2, because all of the permanent magnets are produced into identical shapes, one problem is that incorrect installation occurs easily when permanent magnets that have different directions of magnetization are installed in magnet insertion apertures that are formed on the rotor core so as to make the Halbach array, reducing rotor assemblability.

The present invention aims to solve the above problems and an object of the present invention is to provide a rotor, and a rotary electric machine that includes that rotor, that enables high-speed rotation and reduces leaking of magnetic flux between magnetic poles to enable increased torque, by configuring individual magnetic poles using a plurality of magnet blocks, and that also suppresses the occurrence of incorrect installation of the magnet blocks into a rotor core, to enable assemblability to be improved.

Means for Solving the Problem

In order to achieve the above object, according to one aspect of the present invention, there is provided a rotor in which a plurality of permanent magnets are each embedded on an outer circumferential side of a rotor core and are disposed at a set pitch in a circumferential direction to form magnetic poles, and in which each of the permanent magnets that forms a magnetic pole is configured by arranging n magnet blocks so as to be spaced apart from each other circumferentially, where n is a natural number that is greater than or equal to 3. The n magnet blocks are each formed such that a cross-sectional shape that is perpendicular to a central axis of the rotor core is radially outwardly convex, and a circumferential width of magnet blocks that are nearest to interpolar centers is narrowest; and the n magnet blocks that are arranged circumferentially are configured so as to have mirror symmetry relative to a plane that passes through a magnetic pole center and a central axis of the rotor core.

Effects of the Invention

According to the present invention, because the permanent magnets that form magnetic poles each include n magnet blocks that are formed so as to have radially outwardly convex cross-sectional shapes, strength against centrifugal forces is increased, enabling high-speed rotation, and magnetic leakage flux between the magnetic poles is also reduced, enabling increased torque to be achieved.

In addition, the n magnet blocks that are arranged circumferentially are formed such that circumferential widths thereof are narrowest in the magnet blocks that are nearest to interpolar centers, and are configured so as to have mirror symmetry relative to a plane that passes through the magnetic pole center and the central axis of the rotor core. Thus, the occurrence of incorrect installation when installing the magnet blocks into the rotor core is suppressed, increasing rotor assemblability.

DESCRIPTION OF EMBODIMENTS

Preferred embodiments of a rotor of an embedded permanent magnet rotary electric machine according to the present invention will now be explained with reference to the drawings.

Embodiment 1

Figure 1:
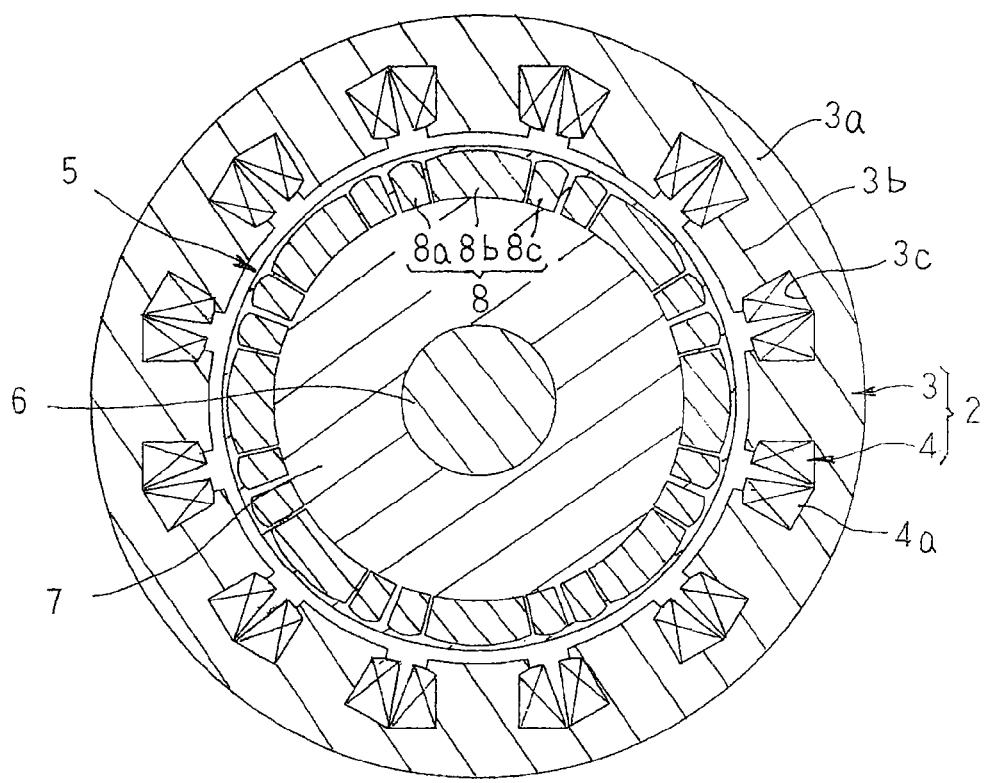
FIG. 1 is a lateral cross section that shows an embedded permanent magnet rotary electric machine according to Embodiment 1 of the present invention.
Figure 2:
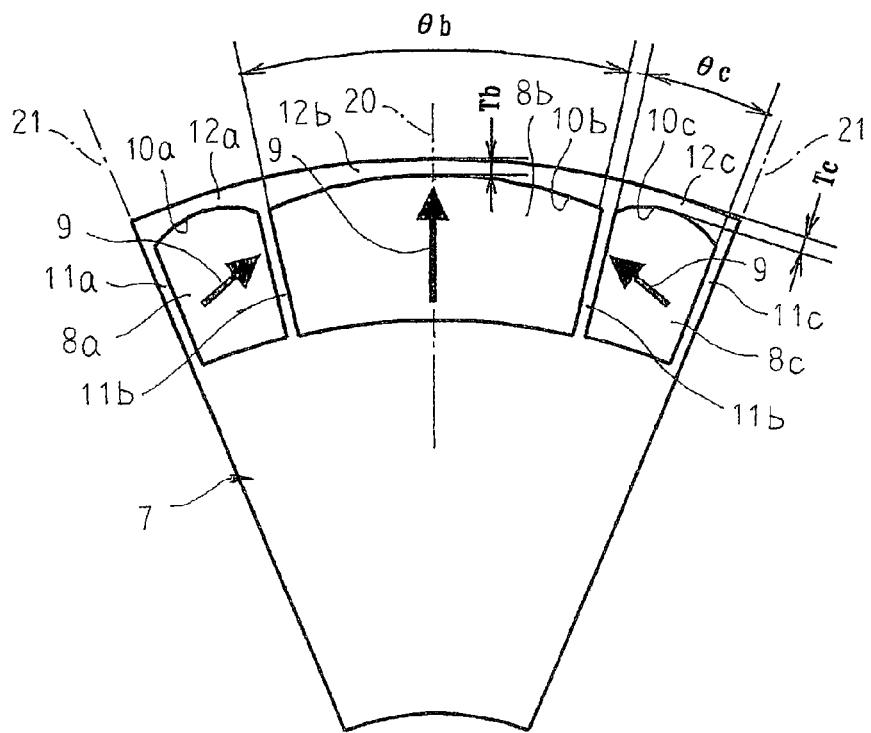
FIG. 2 is a partial cross section that explains a configuration of a permanent magnet that forms part of an individual magnetic pole of a rotor in the embedded permanent magnet rotary electric machine according to Embodiment 1 of the present invention.
Figure 3:
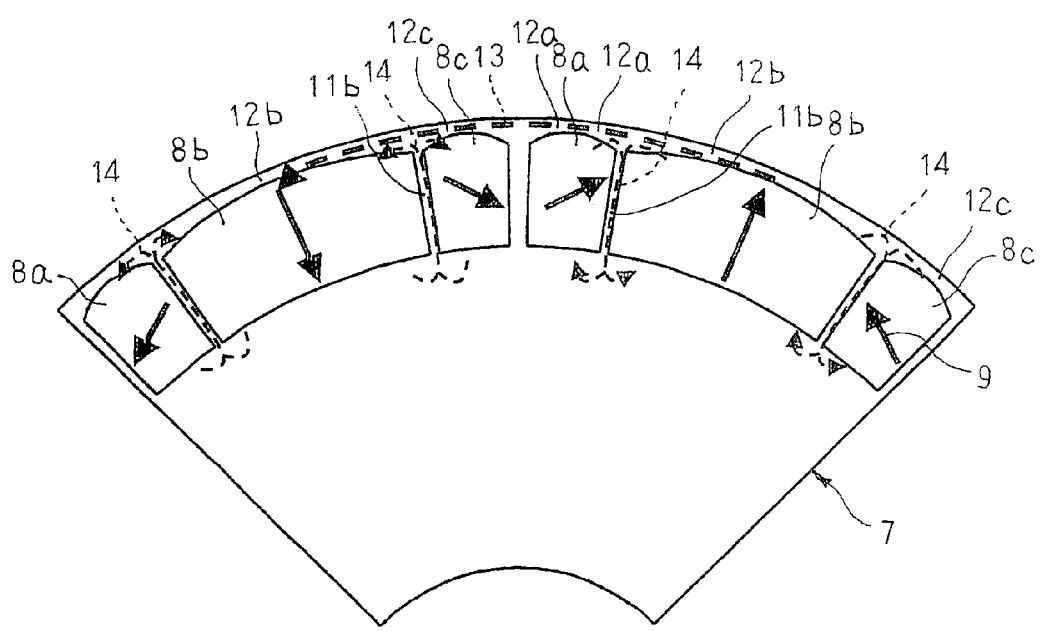
FIG. 3 is a schematic diagram that explains a pathway of magnetic leakage flux inside the rotor in the embedded permanent magnet rotary electric machine according to Embodiment 1 of the present invention.
Figure 4:
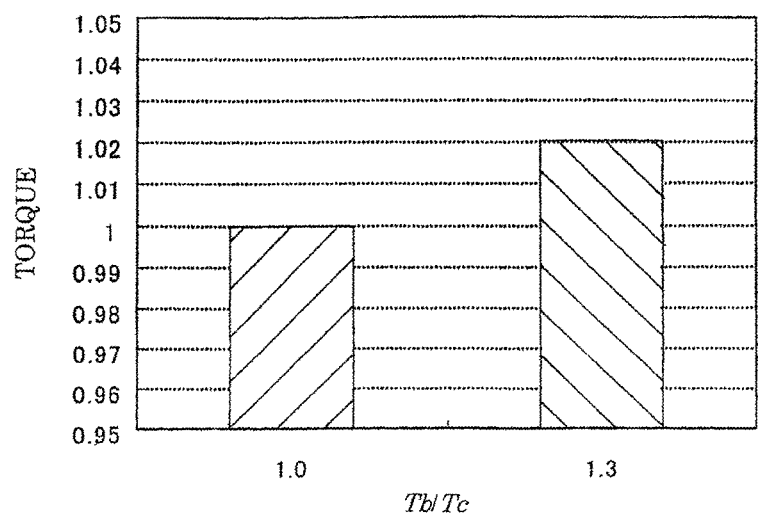
FIG. 4 is a graph that shows results of torque analysis on the embedded permanent magnet rotary electric machine according to Embodiment 1 of the present invention.

FIG. 1 is a lateral cross section that shows an embedded permanent magnet rotary electric machine according to Embodiment 1 of the present invention, FIG. 2 is a partial cross section that explains a configuration of a permanent magnet that forms part of an individual magnetic pole of a rotor in the embedded permanent magnet rotary electric machine according to Embodiment 1 of the present invention, FIG. 3 is a schematic diagram that explains a pathway of magnetic leakage flux inside the rotor in the embedded permanent magnet rotary electric machine according to Embodiment 1 of the present invention, and FIG. 4 is a graph that shows results of torque analysis on the embedded permanent magnet rotary electric machine according to Embodiment 1 of the present invention. Moreover, for simplicity, a stator winding is omitted from FIG. 1. Furthermore, a lateral cross section is a cross section that shows a section that is perpendicular to a central axis of a rotating shaft.

In FIG. 1, an embedded permanent magnet rotary electric machine 1 includes: a stator 2 that has: an annular stator core 3; and a stator winding 4 that is mounted to the stator core 3; and a rotor 5 that is fixed to a rotating shaft 6, and that is rotatably disposed on an inner circumferential side of the stator 2 so as to ensure a constant gap away from the stator core 3.

The stator core 3 has: an annular core back 3a; and twelve teeth 3b that are respectively arranged so as to project radially inward at a predetermined pitch in a circumferential direction from an inner circumferential surface of the core back 3a, and is produced by stacking and integrating a number of electromagnetic steel sheets that have been punched into identical shapes, for example. Regions that are surrounded by the core back 3a and adjacent teeth 3b form slots 3c. The stator winding 4 includes twelve concentrated winding coils 4a that are produced by winding a conductor wire for a plurality of turns onto each of the teeth 3b. The twelve concentrated winding coils 4a are arranged such that a sequence of a U phase, a V phase, and a W phase is repeated four times circumferentially, for example.

The rotor 5 includes: a rotor core 7 that has a cylindrical surface as an outer circumferential surface; the rotating shaft 6, which is mounted to the rotor core 7 so as to pass through a central position thereof and is fixed by press-fitting, by shrinkage fitting, or by a key; and eight sets of permanent magnets 8 that each include three magnet blocks 8a, 8b, and 8c, and that are mounted so as to pass through an outer circumferential side of the rotor core 7. The circumferentially adjacent eight sets of permanent magnets 8 are each disposed such that different magnetic poles alternate circumferentially.

The rotor core 7 is produced by laminating and integrating electromagnetic steel sheets that have been punched into an annular shape, for example. As shown in FIG. 2, sets of magnet insertion apertures 10a, 10b, and 10c have respective aperture shapes that have fan-shaped cross sections in which inner circumferential surfaces are circular arc-shaped surfaces that have identical radii of curvature, and outer circumferential surfaces are circular arc-shaped surfaces that have smaller radii of curvature than the inner circumferential surfaces, eight sets being formed at a uniform angular pitch in a circumferential direction so as to pass axially through the outer circumferential side of the rotor core 7. The magnet insertion apertures 10a and 10c are formed so as to have identical aperture shapes, and are disposed on two circumferential sides of magnet insertion aperture 10b so as to have rib portions 11b interposed. The magnet insertion apertures 10a, 10b, and 10c that are disposed in this manner, have mirror symmetry relative to a plane that passes through a magnetic pole center 20 (a circumferentially central position of a North-seeking (N) pole, for example) and a central axis of the rotating shaft 6 (the rotor core 7).

Here, a circumferential width θc of the magnet insertion apertures 10a and 10c is narrower than a circumferential width θb of the magnet insertion aperture 10b. Furthermore, a radial width (a minimum distance Tc) at circumferentially central positions of bridge portions 12a and 12c is narrower than a radial width (a minimum distance Tb) at a circumferentially central position of the bridge portion 12b.

Moreover, the bridge portion 12b is a portion of the rotor core 7 on an outer circumferential side of the magnet insertion aperture 10b, and the bridge portions 12a and 12c are portions of the rotor core 7 on the outer circumferential sides of the magnet insertion apertures 10a and 10c, respectively. Portions of the rotor core 7 between the magnet insertion apertures 10a and 10c and planes that pass through interpolar centers 21 (circumferentially central positions between the N poles and South-seeking (S) poles) and the rotating shaft 6 are each called rib portions 11a and 11c. The rib portions 11a and 11c are integrated to form interpolar rib portions.

The magnet blocks 8a, 8b, and 8c are produced into prisms that each have a length that is equal to an axial length of the rotor core 7, and that have radially outwardly convex cross-sectional shapes that approximately match the aperture cross-sectional shapes of the magnet insertion apertures 10a, 10b, and 10c. The magnet blocks 8a, 8b, and 8c are inserted into the respective magnet insertion apertures 10a, 10b, and 10c, and are fixed using an adhesive, etc. Moreover, bonded magnets, which are easily produced into the desired shapes, are preferable as the material for the magnet blocks 8a, 8b, and 8c, but sintered magnets such as neodymium magnets, samarium-cobalt magnets, ferrite magnets, etc., may be used.

In addition, as shown in FIG. 2, the magnet block 8b is magnetically oriented such that a direction of magnetization 9 is radially outward, and the magnet blocks 8a and 8c are magnetically oriented such that directions of magnetization 9 are radially outward and toward the magnetic pole center 20. In other words, the three magnet blocks 8a, 8b, and 8c that form the permanent magnet 8 are arranged into a Halbach array circumferentially, such that an N pole arises on the surface of the rotor core 7.

As shown in FIG. 3, the magnet block 8b of the permanent magnet 8 that forms the S pole is magnetically oriented such that a direction of magnetization 9 is radially inward, and the magnet blocks 8a and 8c are magnetically oriented such that directions of magnetization 9 are radially inward and away from the magnetic pole center 20. In other words, these three magnet blocks 8a, 8b, and 8c are arranged into a Halbach array circumferentially, such that an S pole arises on the surface of the rotor core 7.

The circumferentially adjacent eight sets of permanent magnets 8 are each magnetically oriented such that different magnetic poles alternate circumferentially. The shapes and directions of magnetization 9 of the magnet blocks 8a, 8b, and 8c that form the respective sets of permanent magnets 8, which are arranged circumferentially in this manner, have mirror symmetry relative to a plane that passes through the magnetic pole center 20 and the central axis of the rotating shaft 6.

The embedded permanent magnet rotary electric machine 1 that is configured in this manner operates as an eight-pole, twelve-slot inner-rotor electric motor or generator.

According to Embodiment 1, the respective sets of permanent magnets 8 are formed by the three magnet blocks 8a, 8b, and 8c, the magnet blocks 8a, 8b, and 8c are formed so as to have radially outwardly convex cross-sectional shapes, and the circumferential arrangement of the magnet blocks 8a, 8b, and 8c is a Halbach array. Thus, strength against centrifugal forces is ensured, enabling high-speed rotation, and magnetic flux from the permanent magnets 8 is less likely to leak through the bridge portions 12a, 12b, and 12c, preventing torque reduction, and enabling togging torque to be reduced.

In addition, the circumferential width θc of the magnet blocks 8a and 8c is narrower than the circumferential width θb of the magnet block 8b, and the shapes and directions of magnetization 9 of the magnet blocks 8a, 8b, and 8c that form part of the respective sets of permanent magnets 8 have mirror symmetry relative to a plane that passes through the magnetic pole center 20 and the central axis of the rotating shaft 6. Thus, because the magnet blocks 8a and 8c cannot be inserted into the magnet insertion aperture 10b, and the magnet block 8b cannot be inserted into the magnet insertion apertures 10a and 10c, incorrect assembly of the magnet blocks 8a, 8b, and 8c is reduced, improving assemblability of the rotor 5.

Next, strength of the rotor 5 against centrifugal forces will be explained.

When the rotor 5 is rotated, centrifugal forces act on each of the magnet blocks 8a, 8b, and 8c. The centrifugal force that acts on the magnet block 8b is borne by the bridge portion 12b, and stress is concentrated at the minimum width portion of the bridge portion 12b. The centrifugal forces that act on the magnet blocks 8a and 8c are borne by the bridge portions 12a and 12c, and stresses are concentrated at the minimum width portions of the bridge portions 12a and 12c. Here, the circumferential width θb of the magnet block 8b is wider than the circumferential width θc of the magnet blocks 8a and 8c, and the magnet block 8b has the heaviest weight. Thus, the centrifugal force that acts on the magnet block 8b is greater than the centrifugal forces that act on the magnet blocks 8a and 8b. Thus, the stress that arises in the minimum width portion of the bridge portion 12b is greater than the stresses that arise in the minimum width portions of the bridge portions 12a and 12c.

Consequently, the minimum distance Tb of the minimum width portion of the bridge portion 12b is set to a width that can hold the magnet block 8b in opposition to the centrifugal force that acts on the magnet block 8b. The minimum distance Tc of the minimum width portions of the bridge portions 12a and 12c, on the other hand, can be set to a width that is less than Tb, provided that the width can hold the magnet blocks 8a and 8c in opposition to the centrifugal forces that act on the magnet blocks 8a and 8c. Moreover, the rib portions 11b are set to a width that is equal to the minimum distance Tb of the bridge portion 12b, and the rib portions 11a and 11c are set to widths that are equal to the minimum distance Tc of the bridge portions 12a and 12c.

Now, inside the rotor 5, as shown in FIG. 3, there is: magnetic leakage flux 13 that flows from the magnet blocks 8b that form part of the N poles through the bridge portions 12a, 12b, and 12c that form the outer circumferential side of the rotor core 7 to the magnet blocks 8b that form part of the S poles; and magnetic leakage flux 14 that flows through the rib portions 11b. The magnetic leakage flux 13 arises between the N poles and the S poles, making it particularly problematic. The magnitude of this magnetic leakage flux 13 is determined by the minimum distance Tc of the minimum width portions of the bridge portions 12a and 12c.

In Embodiment 1, because the minimum distance Tc of the bridge portions 12a and 12c is made narrower than the minimum distance Tb of the bridge portion 12b, the amount of magnetic flux leakage between the magnetic poles can be reduced compared to when the minimum distances of the three bridge portions 12a, 12b, and 12c are all equal, i.e., equal to the minimum distance Tb. The no-load induced voltage of the electric motor can thereby be improved, enabling torque to be increased.

Now, results of magnetic field analysis on the relationship between the minimum distances Tb and Tc of the bridge portions 12a, 12b, and 12c and torque are shown in FIG. 4. From FIG. 4, it has been possible to confirm that when Tb=1.3 Tc, torque is improved by 0.2 percent compared to when Tb=Tc.

Figure 5:
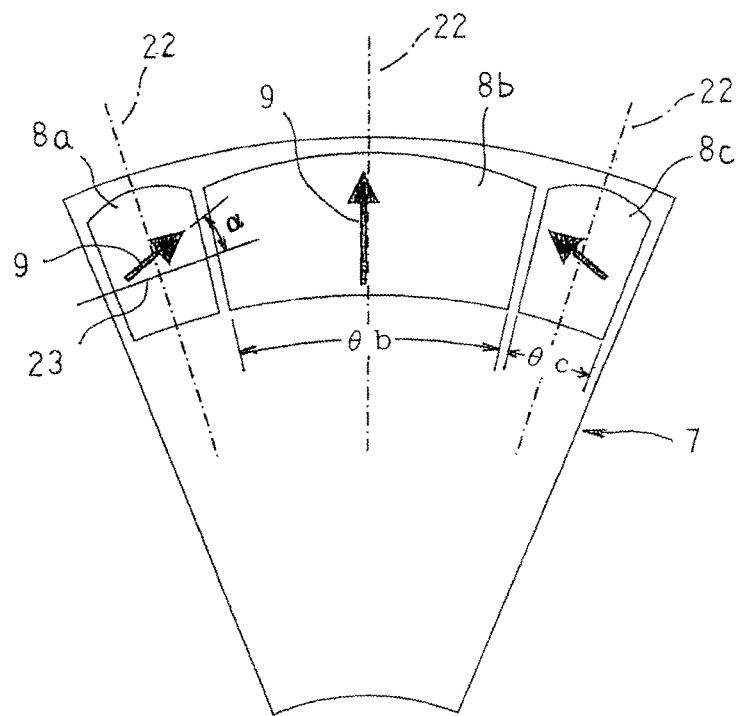
FIG. 5 is a diagram that explains directions of magnetization of magnet blocks in the rotor of the embedded permanent magnet rotary electric machine according to Embodiment 1 of the present invention.
Figure 8:
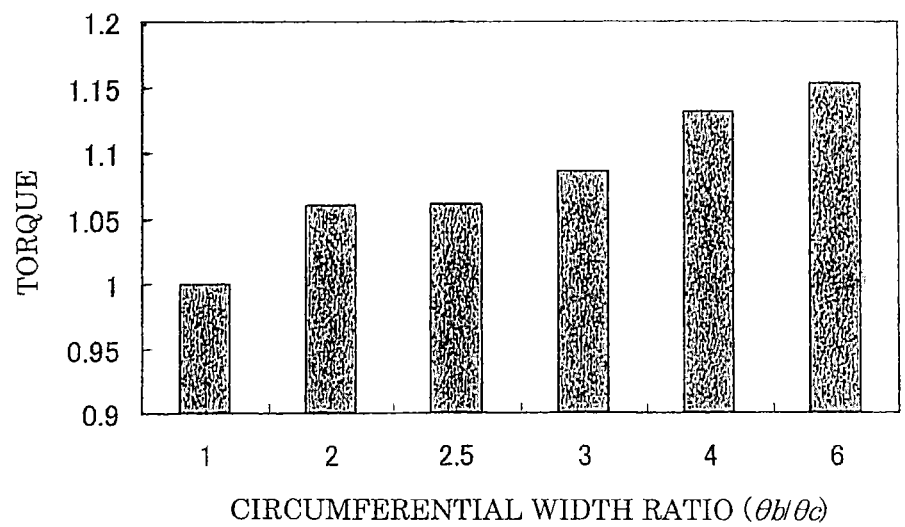
FIG. 8 is a graph that shows maximum torque for respective circumferential width ratios in the embedded permanent magnet rotary electric machine according to Embodiment 1 of the present invention.
Figure 9:
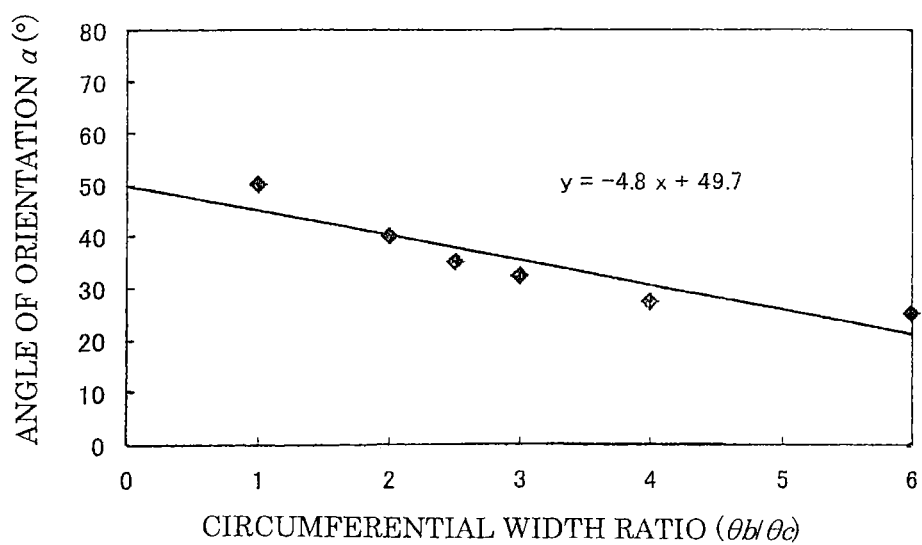
FIG. 9 is a graph that shows a relationship between direction of magnetization at maximum torque and circumferential width ratios of magnets in the embedded permanent magnet rotary electric machine according to Embodiment 1 of the present invention.

Next, a relationship between the directions of magnetization 9 of the magnet blocks 8a, 8b, and 8c and torque will be explained using FIGS. 5 through 9. FIG. 5 is a diagram that explains directions of magnetization of magnet blocks in the rotor of the embedded permanent magnet rotary electric machine according to Embodiment 1 of the present invention, FIG. 6 is a graph that shows a relationship between torque and direction of magnetization in the embedded permanent magnet rotary electric machine according to Embodiment 1 of the present invention, FIG. 7 is a graph that shows relationships between torque and direction of magnetization for different circumferential width ratios in the embedded permanent magnet rotary electric machine according to Embodiment 1 of the present invention, FIG. 8 is a graph that shows maximum torque for respective circumferential width ratios in the embedded permanent magnet rotary electric machine according to Embodiment 1 of the present invention, and FIG. 9 is a graph that shows a relationship between direction of magnetization at maximum torque and circumferential width ratios of magnets in the embedded permanent magnet rotary electric machine according to Embodiment 1 of the present invention.

In FIG. 5, the direction of magnetization 9 of the magnet block 8b is parallel to a circumferential center line 22 of the magnet block 8b in a plane that is perpendicular to the central axis of the rotating shaft 6. The directions of magnetization 9 of the magnet blocks 8a and 8c are inclined at an angle of orientation $\alpha$ relative to straight lines 23 that are perpendicular to circumferential center lines 22 of the magnet blocks 8a and 8c in the plane that is perpendicular to the central axis of the rotating shaft 6. Here, if the angle of orientation $\alpha$ is 0 degrees, the directions of magnetization 9 are oriented in a circumferential direction, and if the angle of orientation $\alpha$ is 90 degrees, the directions of magnetization 9 are oriented in a radial direction. Moreover, the circumferential center line 22 of the magnet block 8a is a straight line that passes through a circumferentially central position of the magnet block 8a and the central axis of the rotating shaft 6 in a plane that is perpendicular to the central axis of the rotating shaft 6. The circumferential center lines 22 of the magnet blocks 8b and 8c are defined similarly. The circumferential center line 22 of the magnet block 8b is aligned with the magnetic pole center 20.

Figure 6:
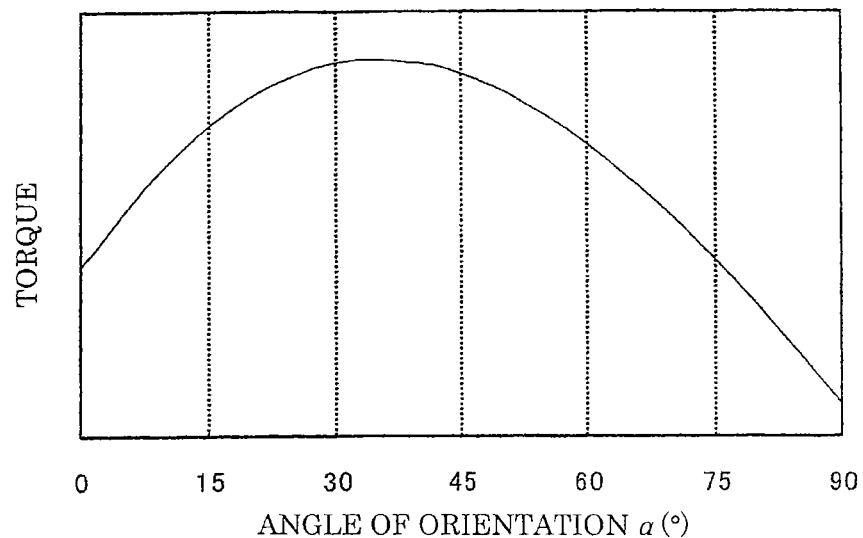
FIG. 6 is a graph that shows a relationship between torque and direction of magnetization in the embedded permanent magnet rotary electric machine according to Embodiment 1 of the present invention.

First, results of performing magnetic field analyses of torque while changing the angle of orientation $\alpha$ of the directions of magnetization 9 of the magnet blocks 8a and 8c with a ratio between the circumferential width $\theta c$ of the magnet blocks 8a and 8c and the circumferential width $\theta b$ of the magnet block 8b set to 1:2.5 are shown in FIG. 6. From FIG. 6, it was found that the torque of the electric motor has a maximum value when the angle of orientation $\alpha$ is within a range from 20 through 40 degrees.

Figure 7:
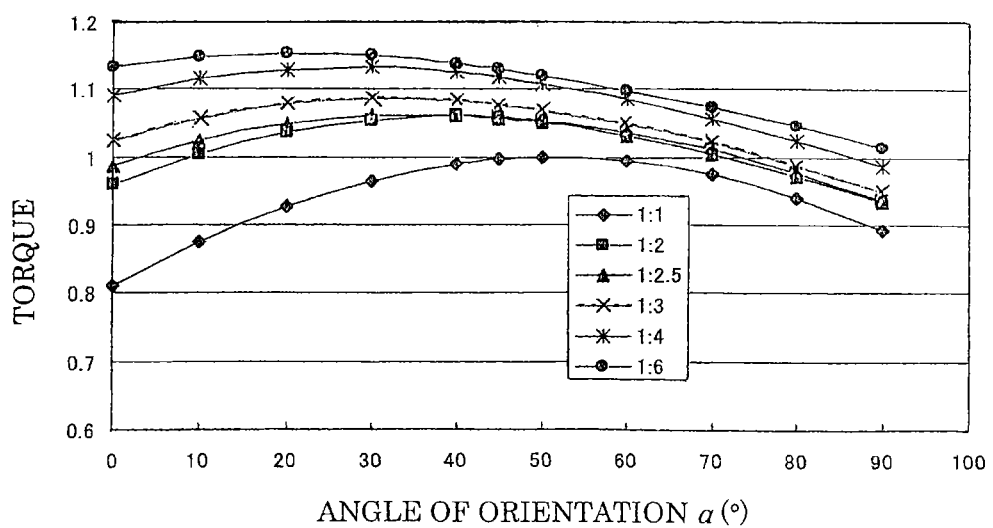
FIG. 7 is a graph that shows relationships between torque and direction of magnetization for different circumferential width ratios in the embedded permanent magnet rotary electric machine according to Embodiment 1 of the present invention.

Next, results of performing magnetic field analyses of torque while changing the angle of orientation $\alpha$ of the directions of magnetization 9 of the magnet blocks 8a and 8c when Tb=Tc, and the ratio between the circumferential width $\theta c$ of the magnet blocks 8a and 8c and the circumferential width $\theta b$ of the magnet block 8b is 1:1, 1:2, 1:2.5, 1:3, 1:4, and 1:6 are shown in FIG. 7. Moreover, in FIG. 7, the torque is standardized such that 1 represents the maximum torque when the circumferential width ratio ($\theta b/\theta c$) is 1:1. From FIG. 7, it was found that the angle of orientation $\alpha$ at which torque is maximized is different when the circumferential width ratio ($\theta b/\theta c$) is different.

Now, maximum torque for each of the circumferential width ratios ($\theta b/\theta c$), based on the analytical results that are shown in FIG. 7, is shown in FIG. 8. In FIG. 8, the maximum torque when Tb=Tc is shown, and the case in which the circumferential width ratio ($\theta b/\theta c$)=1 corresponds to a case in which permanent magnets that have the shapes that are shown in Patent Literature 1 are formed by three magnet blocks. From FIG. 8, it was found that torque increases as the circumferential width ratio ($\theta b/\theta c$) is increased. Moreover, because magnetic leakage flux is reduced by making Tb>Tc, even larger torque can be achieved.

Next, a relationship between the angle of orientation $\alpha$ and the circumferential width ratio ($\theta b/\theta c$) when torque is maximized, based on the analytical results that are shown in FIG. 7, is shown in FIG. 9. From FIG. 9, it was found that the angle of orientation $\alpha$ at which torque is maximized is in a proportional relationship with the circumferential width ratio ($\theta b/\theta c$), the angle of orientation $\alpha$ being reduced as the circumferential width ratio ($\theta b/\theta c$) increases. From FIG. 9, the relationship between the angle of orientation $\alpha$ and the circumferential width ratio ($\theta b/\theta c$) can be represented by Expression 1:

$$\alpha = -4.8 \times (\theta b/\theta c) + 49.7 \text{(degrees)} \qquad \text{(Expression 1)}.$$

From FIG. 7, it can be seen that in the vicinity of the angle of orientation $\alpha$ at which torque is maximized, the amount of change in torque relative to the maximum value of torque is less than or equal to one percent within a range of ±10 degrees of the angle of orientation $\alpha$ in question. Thus, in order to increase torque, it is desirable to set the angle of orientation $\alpha$ so as to satisfy Expression 2:

$$\alpha 1\min \leq \alpha \leq \alpha 1\max \qquad \text{(Expression 2)}.$$

Moreover, $\alpha 1\min$ and $\alpha 1\max$ have the following values:
$\alpha 1\min = 39.7 - 4.8 \times (\theta b/\theta c)$ (degrees)(where $\theta b/\theta c \leq 8.27$);
$\alpha 1\min = 0$ (degrees)(where $\theta b/\theta c > 8.27$);
$\alpha 1\max = 59.7 - 4.8 \times (\theta b/\theta c)$ (degrees)(where $\theta b/\theta c \leq 10.35$); and
$\alpha 1\max = 10$ (degrees)(where $\theta b/\theta c > 10.35$).

Figure 10:
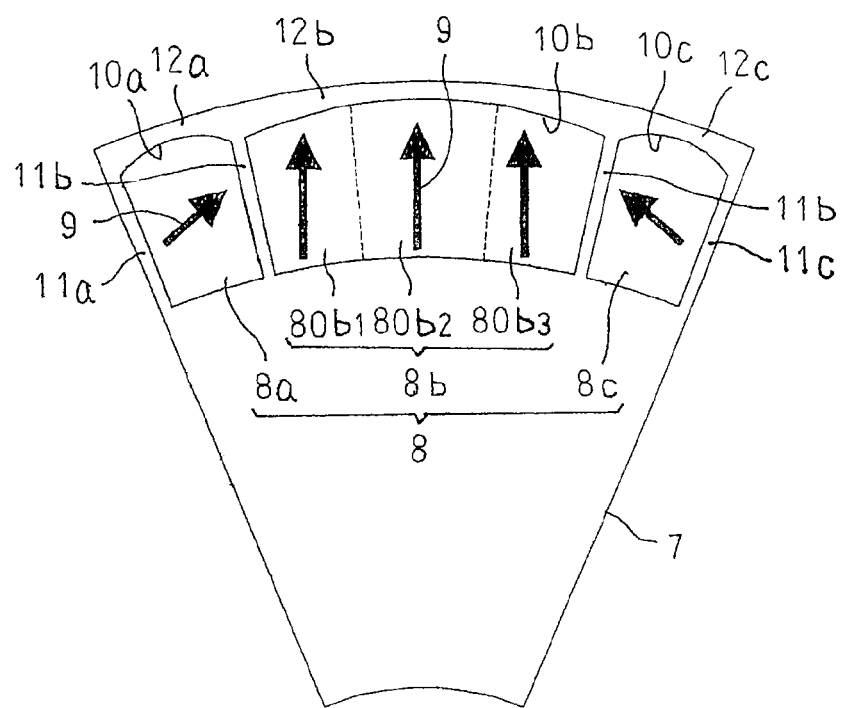
FIG. 10 is a diagram that explains a configuration of a permanent magnet that forms part of an individual magnetic pole of a rotor in an embedded permanent magnet rotary electric machine according to a variation of Embodiment 1 of the present invention.

Moreover, in Embodiment 1 above, the permanent magnets 8 in each pole include three magnet blocks 8a, 8b, and 8c, but as shown in FIG. 10, the magnet block 8b may include: a magnet block 80b2 that is positioned at the magnetic pole center so as to be magnetically oriented such that the direction of magnetization 9 is radially outward; and two magnet blocks 80b1 and 80b3 that are positioned on two circumferential sides of the magnet block 80b2 so as to be magnetically oriented such that the directions of magnetization 9 are parallel to the direction of magnetization 9 of the magnet block 8b2.

Embodiment 2

Figure 11:
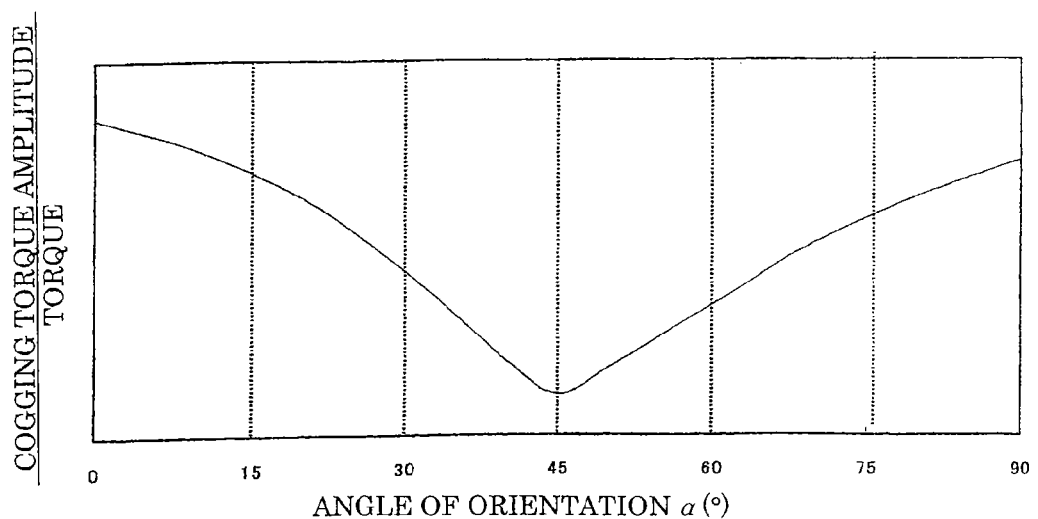
FIG. 11 is a graph that shows a relationship between cogging torque and direction of magnetization in an embedded permanent magnet rotary electric machine according to Embodiment 2 of the present invention.
Figure 12:
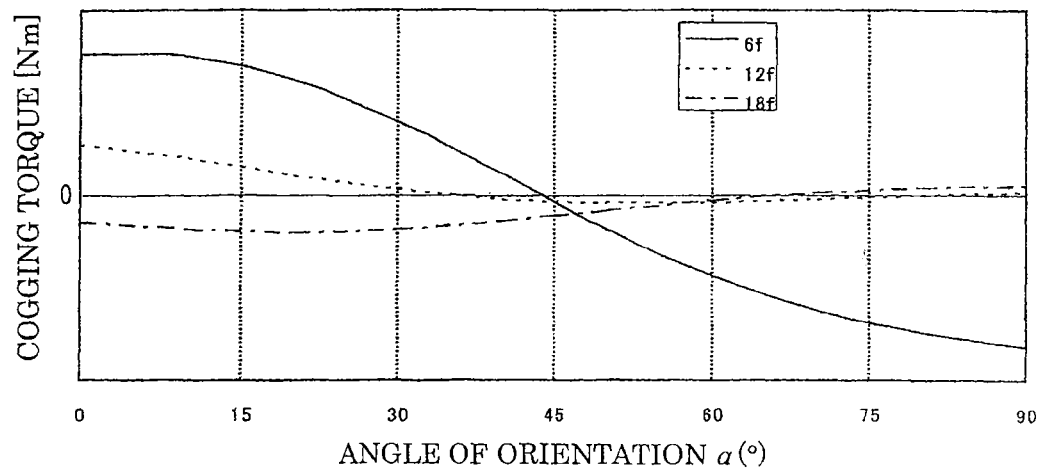
FIG. 12 is a graph that shows relationships between cogging torque by frequency and direction of magnetization in the embedded permanent magnet rotary electric machine according to Embodiment 2 of the present invention.
Figure 13:
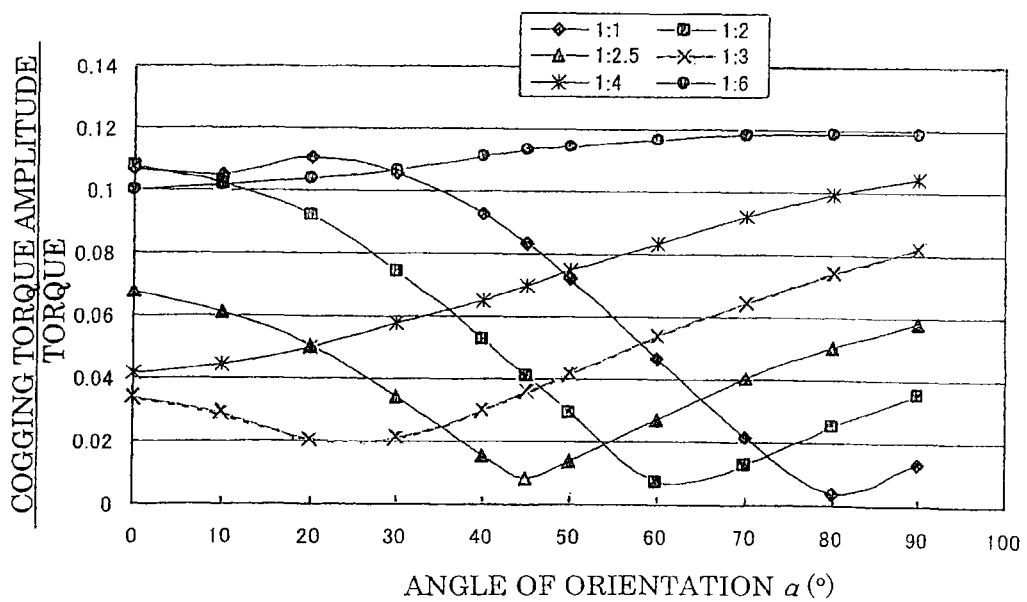
FIG. 13 is a graph that shows relationships between cogging torque/torque and direction of magnetization for different circumferential width ratios in the embedded permanent magnet rotary electric machine according to Embodiment 2 of the present invention.
Figure 14:
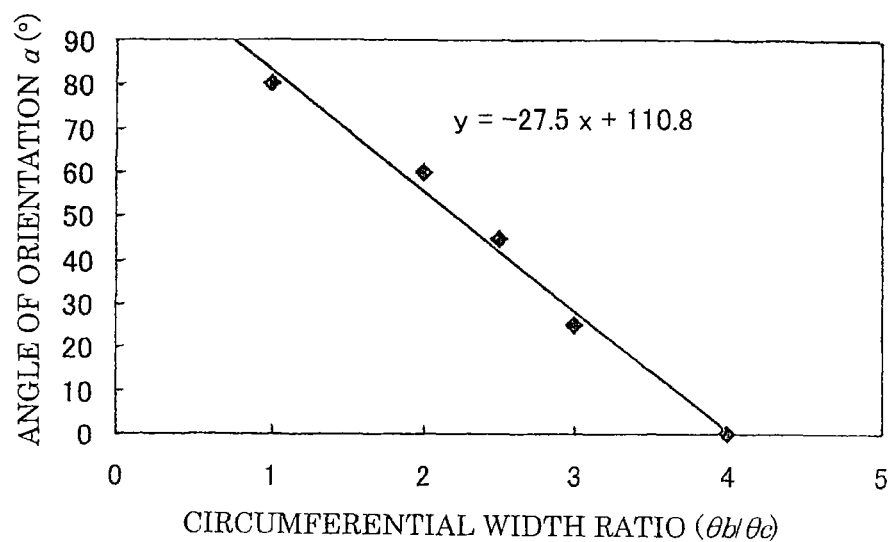
FIG. 14 is a graph that shows a relationship between direction of magnetization at minimum cogging torque/torque and circumferential width ratios of magnets in the embedded permanent magnet rotary electric machine according to Embodiment 2 of the present invention.

In Embodiment 1 above, a relationship between angle of orientation at which torque is maximized and circumferential width ratio of the magnet blocks was shown, but in Embodiment 2, a relationship between cogging torque and angle of orientation will be shown. FIG. 11 is a graph that shows a relationship between cogging torque and direction of magnetization in an embedded permanent magnet rotary electric machine according to Embodiment 2 of the present invention, FIG. 12 is a graph that shows relationships between cogging torque by frequency and direction of magnetization in the embedded permanent magnet rotary electric machine according to Embodiment 2 of the present invention, FIG. 13 is a graph that shows relationships between cogging torque/torque and direction of magnetization for different circumferential width ratios in the embedded permanent magnet rotary electric machine according to Embodiment 2 of the present invention, and FIG. 14 is a graph that shows a relationship between direction of magnetization at minimum cogging torque/torque and circumferential width ratios of magnets in the embedded permanent magnet rotary electric machine according to Embodiment 2 of the present invention. Moreover, the definition of the angle of orientation α is identical to that of Embodiment 1 above.

First, results when amplitude of cogging torque was standardized to torque at the angle of orientation α at which average torque was greatest with a ratio between a circumferential width θc of magnet blocks 8a and 8c and a circumferential width θb of a magnet block 8b set to 1:2.5 are shown in FIG. 11. From FIG. 11, it was found that the absolute value of cogging torque has a minimum value when the angle of orientation α is 45 degrees. From FIG. 11, it was also found that cogging torque in an electric motor is reduced when the angle of orientation α is within a range of 30 through 60 degrees.

Next, results of performing magnetic field analyses of cogging torque for frequency components (6f, 12f, 18f) while changing the angle of orientation α of directions of magnetization 9 of the magnet blocks 8a and 8c with a ratio between the circumferential width θc of the magnet blocks 8a and 8c and the circumferential width θb of the magnet block 8b set to 1:2.5 are shown in FIG. 12. Moreover, f is the frequency per one period of an electrical angle. In FIG. 12, the vertical axis represents cogging torque, positive values being represented above 0, and negative values being represented below 0. Here, cogging torque having a negative value indicates that the phase is 180 degrees (the 6f phase is inverted) where the phase of the cogging torque 6f component when the angle of orientation α is 0 degrees is 0 degrees. From FIG. 12, it was found that the 6f component of the cogging torque adopts a minimum value in a vicinity of an angle of orientation of 45 degrees. In addition, it was found that the 12f component and 18f component of the cogging torque are not generated at greater than or equal to the angle of orientation 45 degrees.

From the above, based on FIGS. 6 and 11, it is preferable to set the angle of orientation α to a range that is greater than or equal to 30 degrees and less than or equal to 45 degrees from the viewpoint of increasing torque and reducing cogging torque. Furthermore, if a plurality of frequency components are present, electric current control of the motor to reduce cogging torque becomes complex. Thus, based on FIG. 12, from the viewpoint of facilitating electric current control of the motor to reduce cogging torque, it is preferable to set the angle of orientation α to a range that is greater than or equal to 45 degrees and less than or equal to 60 degrees in which frequency components other than the 6f component of cogging torque are generated negligibly.

Next, results when amplitude of cogging torque was standardized to torque at the angle of orientation α at which average torque was greatest when Tb=Tc, and the ratio between the circumferential width θc of the magnet blocks 8a and 8c and the circumferential width θb of the magnet block 8b is 1:1, 1:2, 1:2.5, 1:3, 1:4, and 1:6 are shown in FIG. 13. From FIG. 13, it was found that the angle of orientation α at which cogging torque/torque is minimized is different when the circumferential width ratio (θb/θc) is different.

Next, a relationship between the angle of orientation α and the circumferential width ratio (θb/θc) when cogging torque/torque is minimized, based on the results that are shown in FIG. 13, is shown in FIG. 14. From FIG. 14, it was found that the angle of orientation α at which cogging torque/torque is minimized is in a proportional relationship with the circumferential width ratio (OHM, the angle of orientation α being reduced as the circumferential width ratio (θb/θc) increases. From FIG. 14, the relationship between the angle of orientation α and the circumferential width ratio (θb/θc) can be represented by Expression 3:

$$\alpha = -27.5 \times (\theta b/\theta c) + 110.8 \text{(degrees)} \quad \text{(Expression 3)}.$$

From FIG. 13, it can be seen that in the vicinity of the angle of orientation α at which cogging torque/torque is minimized, the amount of change in cogging torque/torque relative to the minimum value of cogging torque/torque is less than or equal to 0.5 percent within a range of ±10 degrees of the angle of orientation α in question. Thus, in order to reduce cogging torque/torque, it is desirable to set the angle of orientation α so as to satisfy Expression 4:

$$\alpha 2\min \leq \alpha \leq \alpha 2\max \quad \text{(Expression 4)}.$$

Moreover, α2min and α2max have the following values:
α2min=100.8−27.5×(θb/θc)(degrees)(where θb/θc≤3.67);
α2min=0 (degrees)(where θb/θc>3.67);
α2max=120.8−27.5×(θb/θc)(degrees)(where θb/θc≤4.03); and
α2max=10 (degrees)(where θb/θc>4.03).

Embodiment 3

Figure 15:
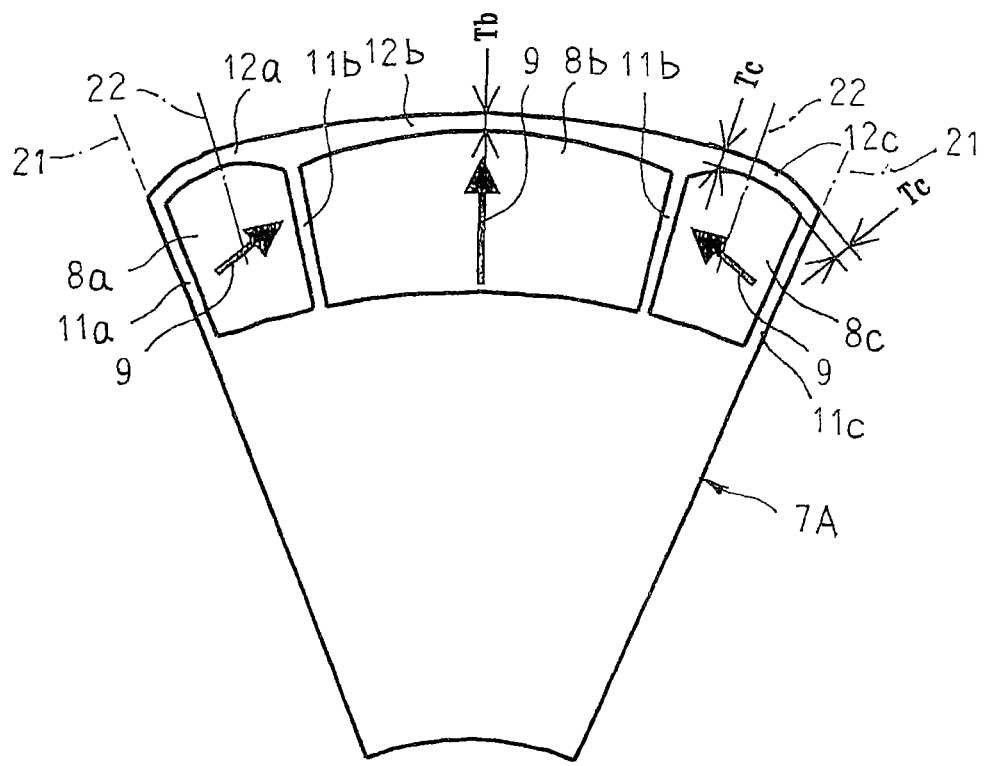
FIG. 15 is a partial cross section that explains a configuration of a permanent magnet that forms part of an individual magnetic pole of a rotor in an embedded permanent magnet rotary electric machine according to Embodiment 3 of the present invention.

FIG. 15 is a partial cross section that explains a configuration of a permanent magnet that forms part of an individual magnetic pole of a rotor in an embedded permanent magnet rotary electric machine according to Embodiment 3 of the present invention.

In FIG. 15, radial widths of bridge portions 12a and 12c of a rotor core 7A in regions that extend from circumferential center lines 22 of magnet blocks 8a and 8c to end portions near interpolar centers 21 are constant, namely, a minimum distance Tc.

Moreover, Embodiment 3 is configured in a similar or identical manner to that of Embodiment 1 above except that the rotor core 7A is used instead of the rotor core 7.

In Embodiment 3, individual magnetic poles include three magnet blocks 8a, 8b, and 8c, the magnet blocks 8a, 8b, and 8c are formed so as to have radially outwardly convex cross-sectional shapes, and the circumferential arrangement of the magnet blocks 8a, 8b, and 8c is a Halbach array. In addition, the circumferential width θc of the magnet blocks 8a and 8c is narrower than the circumferential width θb of the magnet block 8b, and the shapes and directions of magnetization 9 of the magnet blocks 8a, 8b, and 8c that form part of the individual magnetic poles have mirror symmetry relative to a plane that passes through the magnetic pole center 20 and the central axis of the rotating shaft 6. Consequently, similar or identical effects to those of Embodiment 1 above can also be achieved in Embodiment 3.

According to Embodiment 3, the minimum distance Tc of the radial width at the circumferentially central positions of the bridge portions 12a and 12c is shorter than the minimum distance Tb of the radial width at the circumferentially central position of the bridge portion 12b, and the radial widths of the bridge portions 12a and 12c in regions that extend from the circumferential center lines 22 of the magnet blocks 8a and 8c to the end portions near the interpolar centers 21 are a minimum distance Tc. Thus, the amount of magnetic flux leakage that flows from the magnet blocks 8b that form part of the N poles through the bridge portions 12a and 12c to the magnet blocks 8b that form part of the S poles is reduced, enabling the torque of the electric motor to be improved.

Embodiment 4

Figure 16:
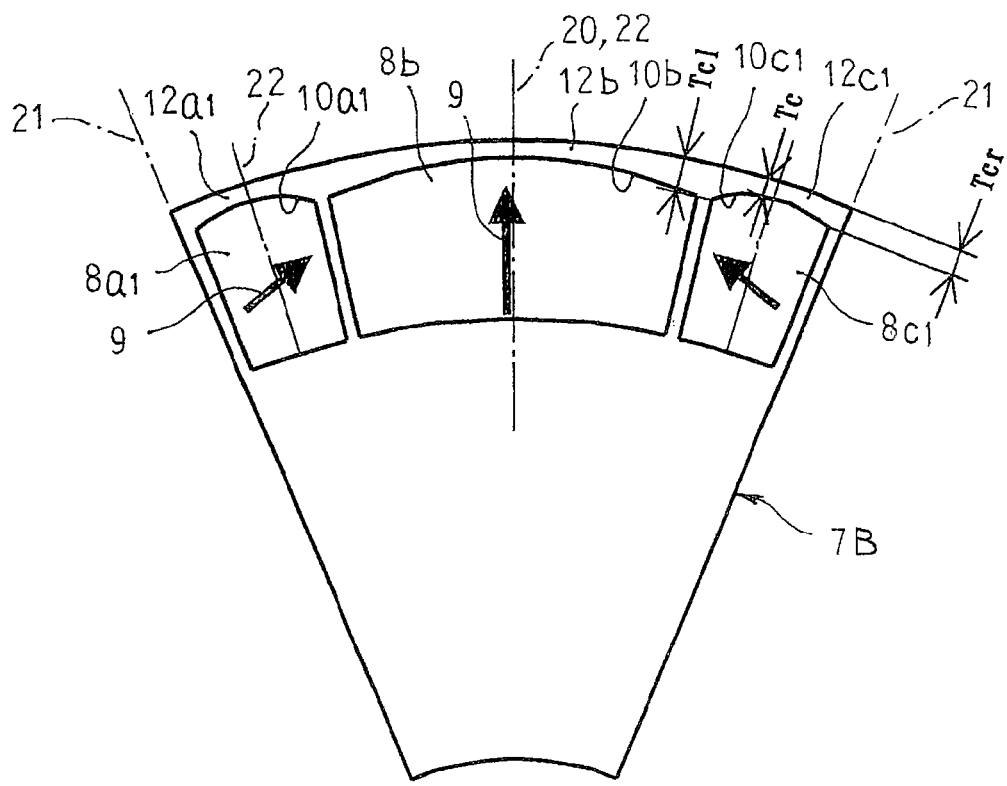
FIG. 16 is a partial cross section that explains a configuration of a permanent magnet that forms part of an individual magnetic pole of a rotor in an embedded permanent magnet rotary electric machine according to Embodiment 4 of the present invention.
Figure 17:
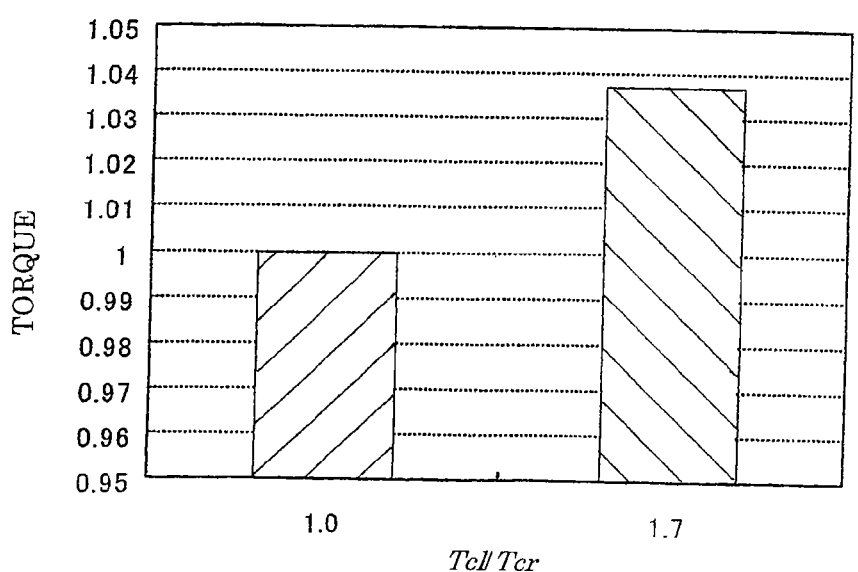
FIG. 17 is a graph that shows a relationship between radial width of bridge portions and torque in the embedded permanent magnet rotary electric machine according to Embodiment 4 of the present invention.

FIG. 16 is a partial cross section that explains a configuration of a permanent magnet that forms part of an individual magnetic pole of a rotor in an embedded permanent magnet rotary electric machine according to Embodiment 4 of the present invention, and FIG. 17 is a graph that shows a relationship between radial width of bridge portions and torque in the embedded permanent magnet rotary electric machine according to Embodiment 4 of the present invention.

In FIG. 16, three magnet blocks 8a1, 8b, and 8c1 form part of an individual magnetic pole. The magnet blocks 8a1 and 8c1 are each produced into prisms that have a fan-shaped cross-sectional shape in which a radial length of a side surface near a magnetic pole center 20 is shorter than a radial length of a side surface near an interpolar center 21. The magnet blocks 8a1 and 8c1 are magnetically oriented in a similar or identical manner to the magnet blocks 8a and 8c. Magnet insertion apertures 10a1, 10b, and 10c1 are respectively formed so as to have aperture shapes that are similar to the cross-sectional shapes of the magnet blocks 8a1, 8b, and 8c1 so as to pass through an outer circumferential side of a rotor core 7B that has a cylindrical surface as an outer circumferential surface.

The three magnet blocks 8a1, 8b, and 8c1 are respectively inserted into the magnet insertion apertures 10a1, 10b, and 10c1, and are fixed to the rotor core 7B using an adhesive, etc. The shapes and directions of magnetization 9 of the three magnet blocks 8a1, 8b, and 8c1 that form part of the individual magnetic pole, which are arranged circumferentially in this manner, have mirror symmetry relative to a plane that passes through the magnetic pole center 20 and the central axis of the rotating shaft 6. Radial widths Tcr of end portions of the bridge portions 12a1 and 12c1 near the interpolar centers 21 are narrower than the radial widths Tcl of end portions near the magnetic pole center 20.

Moreover, the rest of the configuration is formed in a similar or identical manner to that of Embodiment 1 above.

In Embodiment 4, individual magnetic poles include three magnet blocks 8a1, 8b, and 8c1, the magnet blocks 8a1, 8b, and 8c1 are formed so as to have radially outwardly convex cross-sectional shapes, and the circumferential arrangement of the magnet blocks 8a1, 8b, and 8c1 is a Halbach array. In addition, the circumferential width θc of the magnet blocks 8a1 and 8c1 is narrower than the circumferential width θb of the magnet block 8b, and the shapes and directions of magnetization 9 of the magnet blocks 8a1, 8b, and 8c1 that form part of the individual magnetic poles have mirror symmetry relative to planes that pass through the magnetic pole centers 20 and the central axis of the rotating shaft 6. Consequently, similar or identical effects to those of Embodiment 1 above can also be achieved in Embodiment 4.

According to Embodiment 4, the magnet blocks 8a1 and 8c1 are each asymmetric relative to a plane that passes through a circumferential center line 22 and the central axis of the rotating shaft 6, but the shapes and directions of magnetization 9 of the magnet blocks 8a1, 8b, and 8c1 that form part of the individual magnetic poles have mirror symmetry relative to a plane that passes through the magnetic pole center 20 and the central axis of the rotating shaft 6. Thus, by inverting the magnet block 8a1, the shape and direction of magnetization 9 thereof become essentially equal to those of the magnet block 8c1. Incorrect mounting of the magnet blocks 8a1 and 8c1 into the magnet insertion apertures 10a1 and 10c1 is thereby eliminated, enabling improvements in rotor assemblability to be achieved. In addition, the three magnet blocks 8a1, 8b, and 8c1 that form part of the individual poles can be configured using two kinds of magnet blocks, enabling the number of parts can be reduced, thereby enabling reductions in cost to be achieved.

Next, the results of magnetic field analysis on torque when Tcl/Tcr is set to 1 and 1.7 are shown in FIG. 17. Moreover, Tb=Tc. From FIG. 17, it has been possible to confirm that the amount of magnetic flux leakage between the magnetic poles can be reduced and torque can be increased by making the radial width Tcr of the end portions of the bridge portions 12a1 and 12c1 near the interpolar centers 21 narrower than the radial width Tcl of the end portions near the magnetic pole centers 20.

Embodiment 5

Figure 18:
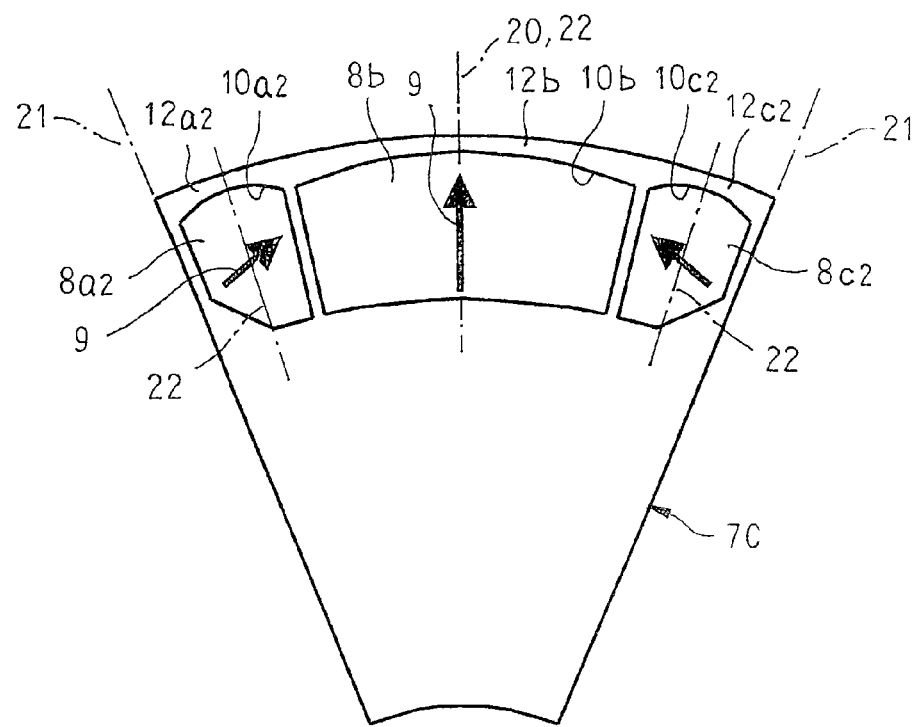
FIG. 18 is a partial cross section that explains a configuration of a permanent magnet that forms part of an individual magnetic pole of a rotor in an embedded permanent magnet rotary electric machine according to Embodiment 5 of the present invention.

FIG. 18 is a partial cross section that explains a configuration of a permanent magnet that forms part of an individual magnetic pole of a rotor in an embedded permanent magnet rotary electric machine according to Embodiment 5 of the present invention.

In FIG. 18, three magnet blocks 8a2, 8b, and 8c2 form part of an individual magnetic pole. The magnet blocks 8a2 and 8c2 are each produced into prisms that have a cross-sectional shape in which corner portions of a fan-shaped cross section are chamfered on a side near an interpolar center 21 on an inner circumferential side. The magnet blocks 8a2 and 8c2 are magnetically oriented in a similar or identical manner to the magnet blocks 8a and 8c. Magnet insertion apertures 10a2, 10b, and 10c2 are respectively formed so as to have aperture shapes that are similar to the cross-sectional shapes of the magnet blocks 8a2, 8b, and 8c2 so as to pass through an outer circumferential side of a rotor core 7C that has a cylindrical surface as an outer circumferential surface.

The three magnet blocks 8a2, 8b, and 8c2 are respectively inserted into the magnet insertion apertures 10a2, 10b, and 10c2, and are fixed to the rotor core 7C using an adhesive, etc. The shapes and directions of magnetization 9 of the three magnet blocks 8a2, 8b, and 8c2 that form part of the individual magnetic pole, which are arranged circumferentially in this manner, have mirror symmetry relative to a plane that passes through the magnetic pole center 20 and the central axis of the rotating shaft 6.

Moreover, the rest of the configuration is formed in a similar or identical manner to that of Embodiment 1 above.

In Embodiment 5, individual magnetic poles include three magnet blocks 8a2, 8b, and 8c2, the magnet blocks 8a2, 8b, and 8c2 are formed so as to have radially outwardly convex cross-sectional shapes, and the circumferential arrangement of the magnet blocks 8a2, 8b, and 8c2 is a Halbach array. The circumferential width of the magnet blocks 8a2 and 8c2 is narrower than the circumferential width of the magnet block 8b, and the minimum distance of the radial width at circumferentially central positions of bridge portions 12a2 and 12c2 is shorter than a minimum distance of a radial width at a circumferentially central position of a bridge portion 12b. In addition, the shapes and directions of magnetization 9 of the magnet blocks 8a2, 8b, and 8c2 that form part of the individual magnetic poles have mirror symmetry relative to planes that pass through the magnetic pole centers 20 and the central axis of the rotating shaft 6. Consequently, similar or identical effects to those of Embodiment 1 above can also be achieved in Embodiment 5.

According to Embodiment 5, the magnet blocks 8a2 and 8c2 are each asymmetric relative to a plane that passes through a circumferential center line 22 and the central axis of the rotating shaft 6, but the shapes and directions of magnetization 9 of the magnet blocks 8a2, 8b, and 8c2 that form part of the individual magnetic pole have mirror symmetry relative to a plane that passes through the magnetic pole center 20 and the central axis of the rotating shaft 6. Thus, by inverting the magnet block 8a2, the shape and direction of magnetization 9 thereof become essentially equal to those of the magnet block 8c2. Incorrect mounting of the magnet blocks 8a2 and 8c2 into the magnet insertion apertures 10a2 and 10c2 is thereby eliminated, enabling improvements in rotor assemblability to be achieved. In addition, the three magnet blocks 8a2, 8b, and 8c2 that form part of the individual poles can be configured using two kinds of magnet blocks, enabling the number of parts can be reduced, thereby enabling reductions in cost to be achieved.

Moreover, in Embodiment 5 above, the magnet blocks 8a2 and 8c2 are formed so as to have cross-sectional shapes in which corner portions of a fan-shaped cross section are chamfered on a side near an interpolar center 21 on an inner circumferential side, and are asymmetric relative to a plane that passes through a circumferential center line 22 and the central axis of the rotating shaft 6. However, the means for making the magnet blocks 8a2 and 8c2 asymmetric relative to the plane that passes through the circumferential center line 22 and the central axis of the rotating shaft 6 is not limited to a means for chamfering the corner portions, provided that the shapes and directions of magnetization 9 of the three magnet blocks 8a2, 8b, and 8c2 that are arranged circumferentially have mirror symmetry relative to planes that pass through the magnetic pole centers 20 and the central axis of the rotating shaft 6.

Embodiment 6

Figure 19:
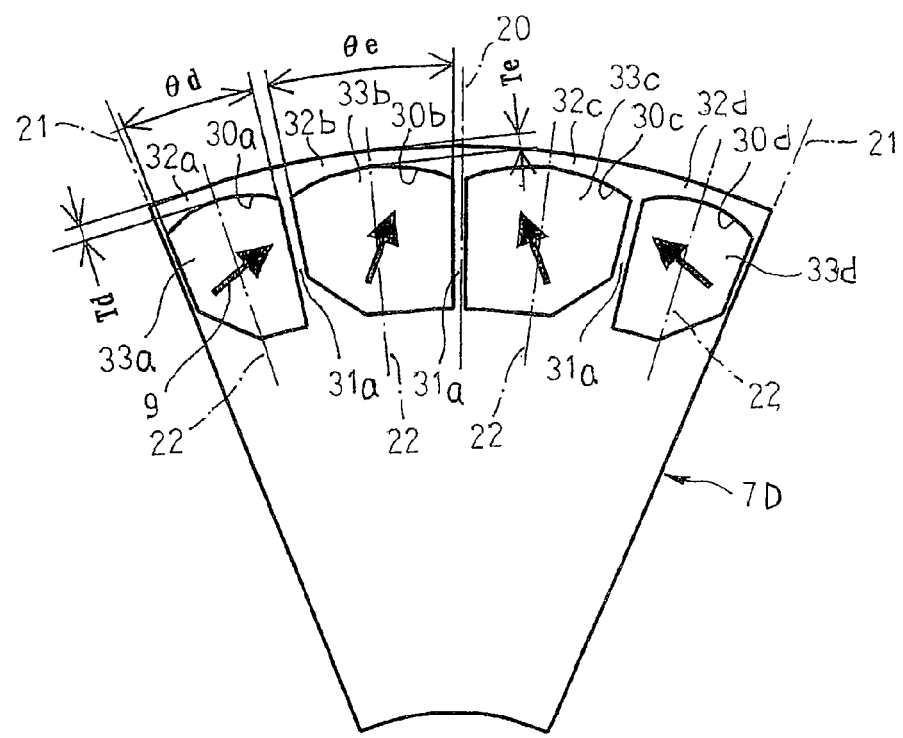
FIG. 19 is a partial cross section that explains a configuration of a permanent magnet that forms part of an individual magnetic pole of a rotor in an embedded permanent magnet rotary electric machine according to Embodiment 6 of the present invention.

FIG. 19 is a partial cross section that explains a configuration of a permanent magnet that forms part of an individual magnetic pole of a rotor in an embedded permanent magnet rotary electric machine according to Embodiment 6 of the present invention.

In FIG. 19, a permanent magnet that forms an individual magnetic pole includes four magnet blocks 33a, 33b, 33c, and 33d.

Magnet insertion apertures 30a, 30b, 30c, and 30d have respective aperture shapes in which corner portions of a fan-shaped cross section are chamfered on a side near an interpolar center 21 on an inner circumferential side, inner circumferential surfaces of the fan-shaped cross sections being circular arc-shaped surfaces that have identical radii of curvature, and outer circumferential surfaces being circular arc-shaped surfaces that have smaller radii of curvature than the inner circumferential surfaces, and are formed so as to be separated from each other in a circumferential direction so as to pass axially through an outer circumferential side of the rotor core 7D that has a cylindrical surface as an outer circumferential surface. The magnet insertion apertures 30b and 30c are disposed in a circumferential direction so as to have rib portions 31a interposed. The magnet insertion apertures 30a and 30d are respectively disposed on two circumferential sides of the magnet insertion apertures 30b and 30c so as to have rib portions 31a interposed. The magnet insertion apertures 30a, 30b, 30c, and 30d that are disposed in this manner, have mirror symmetry relative to a plane that passes through a magnetic pole center 20 and a central axis of a rotating shaft 6. Although not shown, eight sets of magnet insertion apertures 30a, 30b, 30c, and 30d are formed circumferentially around the rotor core 7D at a uniform angular pitch.

Here, a circumferential width θd of the magnet insertion apertures 30a and 30d is narrower than a circumferential width θe of the magnet insertion apertures 30b and 30c. Bridge portions 32a, 32b, 32c, and 32d are formed between the outer circumferential surface of the rotor core 7D and the magnet insertion apertures 30a, 30b, 30c, and 30d, respectively. Furthermore, a radial width (a minimum distance Td) at circumferentially central positions of the bridge portions 32a and 32d is narrower than a radial width (a minimum distance Te) at circumferentially central positions of the bridge portions 32b and 32c.

The magnet blocks 33a, 33b, 33c, and 33d are produced into prisms that each have a length that is equal to an axial length of the rotor core 7D, and that have radially outwardly convex cross-sectional shapes that approximately match the aperture cross-sectional shapes of the magnet insertion apertures 30a, 30b, 30c, and 30d. The magnet blocks 33a, 33b, 33c, and 33d are inserted into the respective magnet insertion apertures 30a, 30b, 30c, and 30d, and are fixed using an adhesive, etc.

In addition, the magnet blocks 33a, 33b, 33c, and 33d are magnetically oriented such that the directions of magnetization 9 are radially outward and toward the magnetic pole center 20. An angle of orientation of the magnet blocks 33b and 33c is greater than an angle of orientation of the magnet blocks 33a and 33d. In other words, the four magnet blocks 33a, 33b, 33c, and 33d that form part of the individual magnetic pole are arranged into a Halbach array circumferentially, such that an N pole arises on the surface of the rotor core 7D.

Four magnet blocks 33a, 33b, 33c, and 33d that form part of an S pole are arranged into a Halbach array circumferentially, and are magnetically oriented radially inward and away from the magnetic pole center 20, such that an S pole arises on the surface of the rotor core 7D.

The shapes and directions of magnetization 9 of the four magnet blocks 33a, 33b, 33c, and 33d that form part of the individual magnetic poles, which are configured in this manner, have mirror symmetry relative to planes that pass through the magnetic pole centers 20 and the central axis of the rotating shaft 6.

Moreover, the rest of the configuration is formed in a similar or identical manner to that of Embodiment 1 above.

In Embodiment 6, individual magnetic poles include four magnet blocks 33a, 33b, 33c, and 33d, the magnet blocks 33a, 33b, 33c, and 33d are formed so as to have radially outwardly convex cross-sectional shapes, and the circumferential arrangement of the magnet blocks 33a, 33b, 33c, and 33d is a Halbach array. The circumferential width θd of the magnet blocks 33a and 33d is narrower than the circumferential width θe of the magnet blocks 33b and 33c, and the minimum distance of the radial width Td at circumferentially central positions of bridge portions 32a and 32d is shorter than the minimum distance Te of the radial width at circumferentially central positions of bridge portions 32b and 32c. In addition, the shapes and directions of magnetization 9 of the magnet blocks 33a, 33b, 33c, and 33d that form part of the individual magnetic poles have mirror symmetry relative to planes that pass through the magnetic pole centers 20 and the central axis of the rotating shaft 6. Consequently, similar or identical effects to those of Embodiment 1 above can also be achieved in Embodiment 6.

According to Embodiment 6, the magnet blocks 33a, 33b, 33c, and 33d are each asymmetric relative to a plane that passes through a circumferential center line 22 and the central axis of the rotating shaft 6, but the shapes and directions of magnetization 9 of the magnet blocks 33a, 33b, 33c, and 33d that form part of the individual magnetic poles have mirror symmetry relative to a plane that passes through the magnetic pole center 20 and the central axis of the rotating shaft 6. Thus, by inverting the magnet block 33a, the shape and direction of magnetization 9 thereof become essentially equal to those of the magnet block 33d. Similarly, by inverting the magnet block 33b, the shape and direction of magnetization 9 thereof become essentially equal to those of the magnet block 33c. Incorrect mounting of the magnet blocks 33a, 33b, 33c, and 33d into the magnet insertion apertures 30a, 30b, 30c, and 30d is thereby eliminated, enabling improvements in rotor assemblability to be achieved. In addition, the four magnet blocks 33a, 33b, 33c, and 33d that form part of the individual poles can be configured using two kinds of magnet blocks, enabling the number of parts can be reduced, thereby enabling reductions in cost to be achieved.

Embodiment 7

Figure 20:
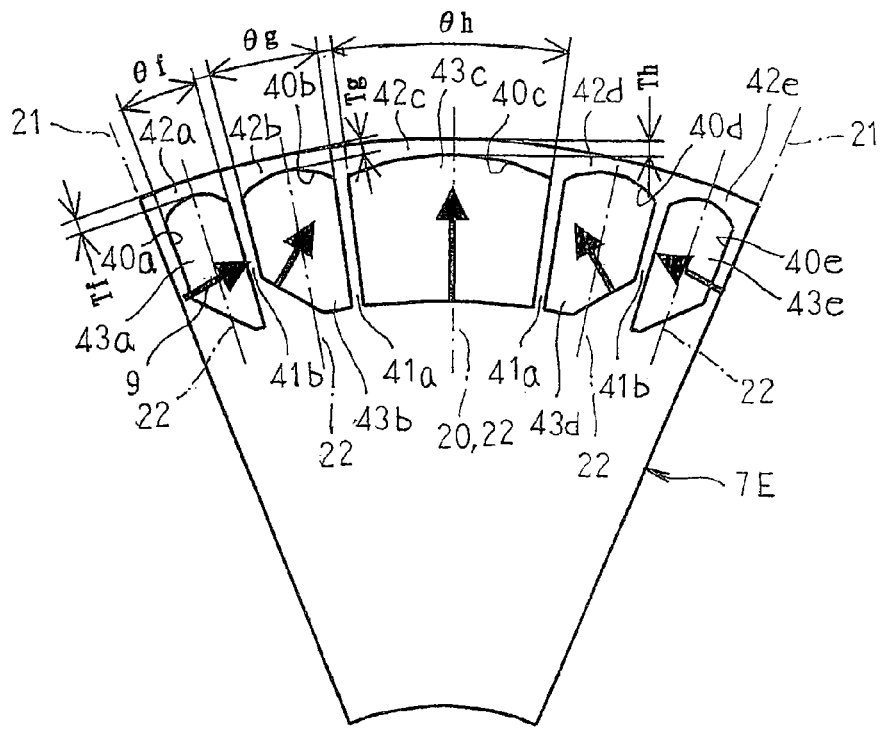
FIG. 20 is a partial cross section that explains a configuration of a permanent magnet that forms part of an individual magnetic pole of a rotor in an embedded permanent magnet rotary electric machine according to Embodiment 7 of the present invention.

FIG. 20 is a partial cross section that explains a configuration of a permanent magnet that forms part of an individual magnetic pole of a rotor in an embedded permanent magnet rotary electric machine according to Embodiment 7 of the present invention.

In FIG. 20, a permanent magnet that forms an individual magnetic pole includes five magnet blocks 43a, 43b, 43c, 43d, and 43e.

A magnet insertion aperture 40c has an aperture shape that has a fan-shaped cross section in which an inner circumferential surface is a circular arc-shaped surface that has a set radius of curvature, and an outer circumferential surface is a circular arc-shaped surface that has a smaller radius of curvature than the inner circumferential surface, and is formed so as to pass axially through an outer circumferential side of a rotor core 7E. In addition, magnet insertion apertures 40a, 40b, 40d, and 40e have respective aperture shapes in which corner portions of a fan-shaped cross section are chamfered on a side near an interpolar center 21 on an inner circumferential side, inner circumferential surfaces of the fan-shaped cross sections being circular arc-shaped surfaces that have identical radii of curvature the inner circumferential surface of the magnet insertion aperture 40c, and outer circumferential surfaces being circular arc-shaped surfaces that have smaller radii of curvature than the inner circumferential surfaces, and are formed so as to be separated from each other in a circumferential direction so as to pass axially through the outer circumferential side of the rotor core 7E that has a cylindrical surface as an outer circumferential surface. The magnet insertion apertures 40b and 40d are respectively disposed on two circumferential sides of the magnet insertion aperture 40c so as to have rib portions 41a interposed. The magnet insertion apertures 40a and 40e are respectively disposed on two circumferential sides of the magnet insertion apertures 40b and 40d so as to have rib portions 41b interposed. The magnet insertion apertures 40a, 40b, 40c, 40d, and 40e that are disposed in this manner, have mirror symmetry relative to a plane that passes through a magnetic pole center 20 and a central axis of a rotating shaft 6. Although not shown, eight sets of magnet insertion apertures 40a, 40b, 40c, 40d, and 40e are formed circumferentially around the rotor core 7E at a uniform angular pitch.

Here, a circumferential width θf of the magnet insertion apertures 40a and 40e is smaller than a circumferential width θg of the magnet insertion apertures 40b and 40d. The circumferential width θg of the magnet insertion apertures 40b and 40d is smaller than a circumferential width θh of the magnet insertion aperture 40c. Bridge portions 42a, 42b, 42c, 42d, and 42e are formed between the outer circumferential surface of the rotor core 7E and the magnet insertion apertures 40a, 40b, 40c, 40d, and 40e, respectively. A radial width (a minimum distances Tf) at circumferentially central positions of the bridge portions 42a and 42e is smaller than a radial width (a minimum distances Tg) at circumferentially central positions of the bridge portions 42b and 42d. In addition, the radial width (the minimum distance Tg) at the circumferentially central positions of the bridge portions 42b and 42d is smaller than a radial width (the minimum distance Th) at a circumferentially central position of the bridge portion 42c.

The magnet blocks 43a, 43b, 43c, 43d, and 43e are produced into prisms that each have a length that is equal to an axial length of the rotor core 7E, and that have radially outwardly convex cross-sectional shapes that approximately match the aperture cross-sectional shapes of the magnet insertion apertures 40a, 40b, 40c, 40d, and 40e. The magnet blocks 43a, 43b, 43c, 43d, and 43e are inserted into the respective magnet insertion apertures 40a, 40b, 40c, 40d, and 40e, and are fixed using an adhesive, etc.

In addition, the magnet block 43c is magnetically oriented such that a direction of magnetization 9 is radially outward. The magnet blocks 43a, 43b, 43d, and 43e are magnetically oriented such that the directions of magnetization 9 are radially outward and toward the magnetic pole center 20. An angle of orientation of the magnet blocks 43b and 43c is greater than an angle of orientation of the magnet blocks 43a and 43e. In other words, the five magnet blocks 43a, 43b, 43c, 43d, and 43e that form part of the individual magnetic pole are arranged into a Halbach array circumferentially, such that an N pole arises on the surface of the rotor core 7E.

A magnet block 43c that forms part of an S pole is magnetically oriented such that a direction of magnetization 9 is radially inward. The magnet blocks 43a, 43b, 43d, and 43e that form part of the S pole are magnetically oriented such that the directions of magnetization 9 are radially inward and toward the magnetic pole center 20. In other words, the five magnet blocks 43a, 43b, 43c, 43d, and 43e that form part of the S pole are arranged into a Halbach array circumferentially, such that an S pole arises on the surface of the rotor core 7E.

The shapes and directions of magnetization 9 of the five magnet blocks 43a, 43b, 43c, 43d, and 43e that form part of the individual magnetic poles, which are configured in this manner, have mirror symmetry relative to planes that pass through the magnetic pole centers 20 and the central axis of the rotating shaft 6.

Moreover, the rest of the configuration is formed in a similar or identical manner to that of Embodiment 1 above.

In Embodiment 7, individual magnetic poles include five magnet blocks 43a, 43b, 43c, 43d, and 43e, the magnet blocks 43a, 43b, 43c, 43d, and 43e are formed so as to have radially outwardly convex cross-sectional shapes, and the circumferential arrangement of the magnet blocks 43a, 43b, 43c, 43d, and 43e is a Halbach array. The circumferential width θf of the magnet blocks 43a and 43e, the circumferential width θg of the magnet blocks 43b and 43d, and the circumferential width θh of the magnet block 43c satisfy θf<θg<θh. The minimum distance Tf of the bridge portions 42a and 42e, the minimum distance Tg of the bridge portions 42b and 42d, and the minimum distance Th of the bridge portion 42c satisfy Tf<Tg<Th. In addition, the shapes and directions of magnetization 9 of the magnet blocks 43a, 43b, 43c, 43d, and 43e that form part of the individual magnetic poles have mirror symmetry relative to planes that pass through the magnetic pole centers 20 and the central axis of the rotating shaft 6. Consequently, similar or identical effects to those of Embodiment 1 above can also be achieved in Embodiment 7.

According to Embodiment 7, the magnet blocks 43a, 43b, 43c, 43d, and 43e are each asymmetric relative to a plane that passes through a circumferential center line 22 and the central axis of the rotating shaft 6, but the shapes and directions of magnetization 9 of the magnet blocks 43a, 43b, 43c, 43d, and 43e that form part of the individual magnetic poles have mirror symmetry relative to a plane that passes through the magnetic pole center 20 and the central axis of the rotating shaft 6. Thus, by inverting the magnet block 43a, the shape and direction of magnetization 9 thereof become essentially equal to those of the magnet block 43e. Similarly, by inverting the magnet block 43b, the shape and direction of magnetization 9 thereof become essentially equal to those of the magnet block 43d. Incorrect mounting of the magnet blocks 43a, 43b, 43c, 43d, and 43e into the magnet insertion apertures 40a, 40b, 40c, 40d, and 40e is thereby eliminated, enabling improvements in rotor assemblability to be achieved. In addition, the five magnet blocks 43a, 43b, 43c, 43d, and 43e that form part of the individual poles can be configured using three kinds of magnet blocks, enabling the number of parts can be reduced, thereby enabling reductions in cost to be achieved.

Moreover, in Embodiment 7 above, the minimum distances Tf, Tg, and Th of the radial widths of the bridge portions 42a through 42e satisfy Tf<Tg<Th, but from the viewpoint of reducing the amount of magnetic flux leakage between the magnetic poles, it is sufficient to satisfy Tf<Tg and Th.

In Embodiment 7 above, the circumferential width θf of the magnet blocks 43a and 43e, the circumferential width θg of the magnet blocks 43b and 43d, and the circumferential width θh of the magnet block 43c satisfy θf<θg<θh, but it is not absolutely necessary for the circumferential width θg of the magnet blocks 43b and 43d to be smaller than the circumferential width θh of the magnet block 43c, provided that θf<θg and θh is satisfied.

Embodiment 8

Figure 21:
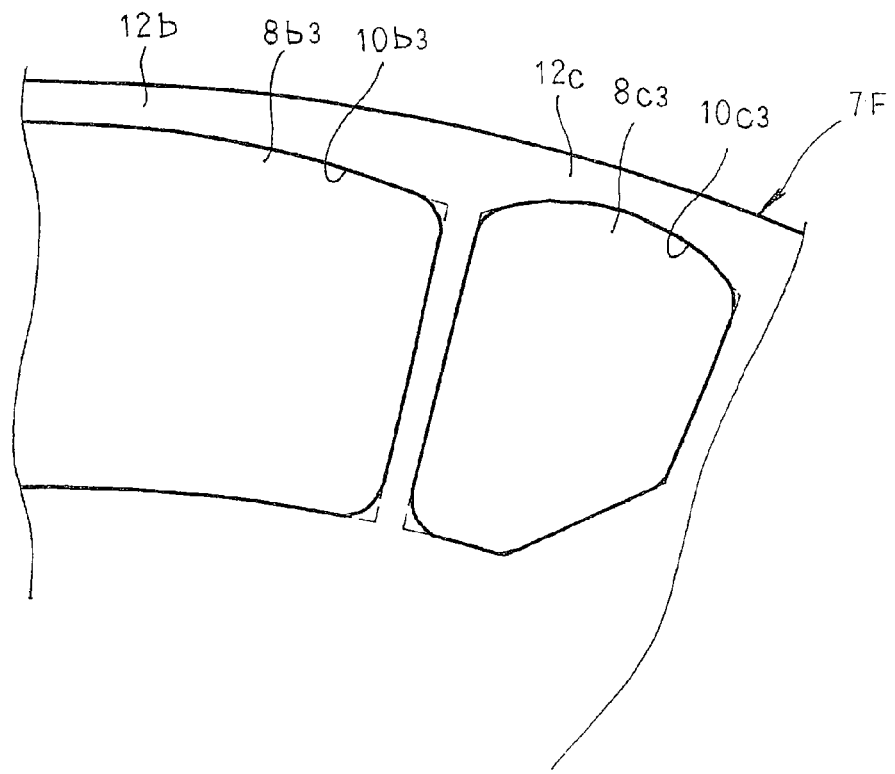
FIG. 21 is a partial cross section that explains a configuration of a permanent magnet that forms part of an individual magnetic pole of a rotor in an embedded permanent magnet rotary electric machine according to Embodiment 8 of the present invention.

FIG. 21 is a partial cross section that explains a configuration of a permanent magnet that forms part of an individual magnetic pole of a rotor in an embedded permanent magnet rotary electric machine according to Embodiment 8 of the present invention.

In FIG. 21, corner portions of magnet blocks 8b3 and 8c3 are rounded in a plane that is perpendicular to a central axis of a rotating shaft 6. A rotor core 7F has a cylindrical surface as an outer circumferential surface, and magnet insertion apertures 10b3 and 10c3 are respectively formed so as to have aperture shapes that are similar to the cross-sectional shapes of the magnet blocks 8b3 and 8c3 so as to pass through an outer circumferential side of a rotor core 7F that has a cylindrical surface as an outer circumferential surface. Here, bridge portions 12b and 12c are defined by the shapes of the magnet blocks 8b and 8c2 before rounding, which are indicated by thin lines. Moreover, although not depicted, a magnet block 8a3 and a magnet insertion aperture 10a3 that are disposed on a circumferentially opposite side of the magnet block 8b3 and the magnet insertion aperture 10b3 are also configured in a similar manner to the magnet block 8c3 and the magnet insertion apertures 10c3.

Because Embodiment 8 is configured in a similar manner to Embodiment 5 above except that the corner portions of the three magnet blocks 8b3 and 8c3 are rounded, similar effects to those in Embodiment 5 above can also be achieved.

Because the corner portions of the magnet blocks 8b3 and 8c3 are rounded, concentration of stress at the rounded portions of the magnet blocks 8b3 and 8c3 is alleviated when centrifugal forces act on the magnet blocks 8b3 and 8c3, increasing strength of the magnet blocks 8b3 and 8c3 against centrifugal force.

Moreover, in each of the above embodiments, an eight-pole, twelve-slot embedded permanent magnet rotary electric machine has been explained, but the ratio between the number of poles and the number of slots is not limited to 2:3.

In each of the above embodiments, cases in which individual magnetic poles include three to five magnet blocks have been explained, but the number of magnet blocks that form part of the individual magnetic poles is not limited to three through five. In other words, the number of magnet blocks that form part of each of the poles may be six or greater provided that the plurality of magnet blocks that form part of an individual pole are each formed so as to have a radially outwardly convex cross-sectional shape, the circumferential arrangement of the plurality of magnet blocks is a Halbach array, the circumferential widths of the plurality of magnet blocks are reduced the further away from a magnetic pole center the magnet blocks are positioned, and the plurality of magnet blocks have mirror symmetry relative to a plane that passes through the magnetic pole center and the central axis of the rotating shaft.

EXPLANATION OF NUMBERING

1 EMBEDDED PERMANENT MAGNET ROTARY ELECTRIC MACHINE; 5 ROTOR; 7, 7A, 7B, 7C, 7D, 7E, 7F ROTOR CORE; 8a, 8a1, 8a2, 8a3, 8b, 8b3, 8c, 8c1, 8c2, 8c3, 33a, 33b, 33c, 33d, 43a, 43b, 43c, 43d, 43e MAGNET BLOCK; 9 DIRECTION OF MAGNETIZATION; 20 MAGNETIC POLE CENTER; 21 INTERPOLAR CENTER; 22 CIRCUMFERENTIAL CENTER LINE.

The invention claimed is:

1. A rotary electric machine comprising a rotor in which a plurality of permanent magnets are each embedded on an outer circumferential side of a rotor core and are disposed at a set pitch in a circumferential direction to form magnetic poles, and in which each of said permanent magnets that forms a magnetic pole is configured by arranging three magnet blocks so as to be spaced apart from each other circumferentially, wherein:
said three magnet blocks are each formed such that a cross-sectional shape that is perpendicular to a central axis of said rotor core is radially outwardly convex, and a circumferential width of magnet blocks that are nearest to interpolar centers is narrowest; and said three magnet blocks that are arranged circumferentially are configured so as to have mirror symmetry relative to a plane that passes through a magnetic pole center and a central axis of said rotor core, directions of magnetization of said three magnet blocks that form North-seeking (N) poles are magnetically oriented in directions that are radially outward and toward said magnetic pole center;

directions of magnetization of said three magnet blocks that form South-seeking (S) poles are magnetically oriented in directions that are radially inward and away from said magnetic pole center; and a direction of magnetization of a first magnet block of said three magnet blocks that is disposed at said magnetic pole center is a radial direction, and where θb is a circumferential width of said first magnet block that is disposed at said magnetic pole center, θc is a circumferential width of second and third magnet blocks of said three magnet blocks that are disposed on interpolar sides, and α is an angle of orientation of said second and third magnet blocks that are disposed on said interpolar sides, said α satisfies α1min ≤α≤α1max, where said α1min and said α1max are:

α1min=39.7−4.8×(θb/θc)(degrees)(where θb/θc≤8.27);
α1min=0(degrees)(where θb/θc>8.27);
α1max=59.7−4.8×(θb/θc)(degrees)(where θb/θc≤10.35); and
α1max=10(degrees)(where θb/θc>10.35).

2. The rotary electric machine according to claim 1, wherein:
outer circumferential surfaces of said three magnet blocks are circular arc-shaped surfaces that have a smaller radius of curvature than inner circumferential surfaces of said three magnet blocks; and
outer circumferential surfaces of said magnet blocks that are nearest to interpolar centers are circular arc-shaped surfaces that have a radius of curvature that is smallest among said three magnet blocks.

3. The rotary electric machine according to claim 1, wherein:
outer circumferential surfaces of said three magnet blocks are circular arc-shaped surfaces that have a smaller radius of curvature than inner circumferential surfaces of said three magnet blocks;
a minimum distance between said magnet blocks that are nearest to said interpolar centers and an outer circumferential surface of said rotor core is shorter than a minimum distance between a remainder of said magnet blocks of said plurality of permanent magnets and said outer circumferential surface of said rotor core; and
a minimum distance between said magnet blocks that are nearest to said interpolar centers and magnet blocks other than said magnet blocks that are nearest to said interpolar centers, that are adjacent to said magnet blocks that are nearest to said interpolar centers, is equal to a smallest minimum distance between said magnet blocks other than said magnet blocks that are nearest to said interpolar centers and said outer circumferential surface of said rotor core.

4. The rotary electric machine according to claim 3, wherein a distance between said magnet blocks that are nearest to said interpolar centers and an outer circumferential surface of said rotor core is maintained at said minimum distance in a region that extends from said circumferentially central positions of said magnet blocks to end portions near said interpolar centers.

5. The rotary electric machine according to claim 1, wherein circumferential widths of said three magnet blocks are formed so as to be narrower in magnet blocks that are further away from said magnetic pole center.

6. The rotary electric machine according to claim 1, wherein a minimum distance between said magnet blocks that are nearest to said interpolar centers and an outer circumferential surface of said rotor core is shorter than a minimum distance between a remainder of said magnet blocks of said plurality of permanent magnets and said outer circumferential surface of said rotor core.

7. The rotary electric machine according to claim 6, wherein a distance between said magnet blocks that are nearest to said interpolar centers and an outer circumferential surface of said rotor core is maintained at said minimum distance in a region that extends from said circumferentially central positions of said magnet blocks to end portions near said interpolar centers.

8. The rotary electric machine according to claim 1, wherein a distance between end portions near said interpolar centers of said magnet blocks that are nearest to said interpolar centers and an outer circumferential surface of said rotor core is shorter than a distance between end portions of said magnet blocks near said magnetic pole center and said outer circumferential surface of said rotor core.

9. The rotary electric machine according to claim 1, wherein said magnet blocks other than said magnet blocks that are positioned at said magnetic pole center are formed so as to be asymmetrical relative to a plane that passes through a circumferential center of each of said magnet blocks and said central axis of said rotor core.

10. A rotary electric machine comprising a rotor in which a plurality of permanent magnets are each embedded on an outer circumferential side of a rotor core and are disposed at a set pitch in a circumferential direction to form magnetic poles, and in which each of said permanent magnets that forms a magnetic pole is configured by arranging three magnet blocks so as to be spaced apart from each other circumferentially, wherein:
said three magnet blocks are each formed such that a cross-sectional shape that is perpendicular to a central axis of said rotor core is radially outwardly convex, and a circumferential width of magnet blocks that are nearest to interpolar centers is narrowest; and said three magnet blocks that are arranged circumferentially are configured so as to have mirror symmetry relative to a plane that passes through a magnetic pole center and a central axis of said rotor core, directions of magnetization of said three magnet blocks that form North-seeking (N) poles are magnetically oriented in directions that are radially outward and toward said magnetic pole center;

directions of magnetization of said three magnet blocks that form South-seeking (S) poles are magnetically oriented in directions that are radially inward and away from said magnetic pole center; and a direction of magnetization of a first magnet block of said three magnet blocks that is disposed at said magnetic pole center is a radial direction, and where $\theta b$ is a circumferential width of said first magnet block that is disposed at said magnetic pole center, $\theta c$ is a circumferential width of second and third magnet blocks of said three magnet blocks that are disposed on interpolar sides, and $\alpha$ is an angle of orientation of said second and third magnet blocks that are disposed on said interpolar sides, said $\alpha$ satisfies $\alpha 2min \leq \alpha \leq \alpha 2max$, where said $\alpha 2min$ and said $\alpha 2max$ are:

$\alpha 2min=100.8-27.5\times(\theta b/\theta c)(degrees)(where \theta b/\theta c \leq 3.67)$;

$\alpha 2min=0(degrees)(where \theta b/\theta c>3.67)$;

$\alpha 2max=120.8-27.5\times(\theta b/\theta c)(degrees)(where \theta b/\theta c \leq 4.03)$; and $\alpha 2max=10(degrees)(where \theta b/\theta c>4.03)$.

11. The rotary electric machine according to claim 10, wherein:

outer circumferential surfaces of said three magnet blocks are circular arc-shaped surfaces that have a smaller radius of curvature than inner circumferential surfaces of said three magnet blocks; and outer circumferential surfaces of said magnet blocks that are nearest to interpolar centers are circular arc-shaped surfaces that have a radius of curvature that is smallest among said three magnet blocks.

12. The rotary electric machine according to claim 10, wherein:

outer circumferential surfaces of said three magnet blocks are circular arc-shaped surfaces that have a smaller radius of curvature than inner circumferential surfaces of said three magnet blocks;

a minimum distance between said magnet blocks that are nearest to said interpolar centers and an outer circumferential surface of said rotor core is shorter than a minimum distance between a remainder of said magnet blocks of said plurality of permanent magnets and said outer circumferential surface of said rotor core; and a minimum distance between said magnet blocks that are nearest to said interpolar centers and magnet blocks other than said magnet blocks that are nearest to said interpolar centers, that are adjacent to said magnet blocks that are nearest to said interpolar centers, is equal to a smallest minimum distance between said magnet blocks other than said magnet blocks that are nearest to said interpolar centers and said outer circumferential surface of said rotor core.

13. The rotary electric machine according to claim 12, wherein a distance between said magnet blocks that are nearest to said interpolar centers and an outer circumferential surface of said rotor core is maintained at said minimum distance in a region that extends from said circumferentially central positions of said magnet blocks to end portions near said interpolar centers.

14. The rotary electric machine according to claim 10, wherein circumferential widths of said three magnet blocks are formed so as to be narrower in magnet blocks that are further away from said magnetic pole center.

15. The rotary electric machine according to claim 10, wherein a minimum distance between said magnet blocks that are nearest to said interpolar centers and an outer circumferential surface of said rotor core is shorter than a minimum distance between a remainder of said magnet blocks of said plurality of permanent magnets and said outer circumferential surface of said rotor core.

16. The rotary electric machine according to claim 15, wherein a distance between said magnet blocks that are nearest to said interpolar centers and an outer circumferential surface of said rotor core is maintained at said minimum distance in a region that extends from said circumferentially central positions of said magnet blocks to end portions near said interpolar centers.

17. The rotary electric machine according to claim 10, wherein a distance between end portions near said interpolar centers of said magnet blocks that are nearest to said interpolar centers and an outer circumferential surface of said rotor core is shorter than a distance between end portions of said magnet blocks near said magnetic pole center and said outer circumferential surface of said rotor core.

18. The rotary electric machine according to claim 10, wherein said magnet blocks other than said magnet blocks that are positioned at said magnetic pole center are formed so as to be asymmetrical relative to a plane that passes through a circumferential center of each of said magnet blocks and said central axis of said rotor core.

* * * * *